US011608688B2

(12) United States Patent
Holtzman

(10) Patent No.: US 11,608,688 B2
(45) Date of Patent: Mar. 21, 2023

(54) SPALLATION DRILL HEAD AND ASSOCIATED METHODS

(71) Applicant: Strabo Engineering, LLC, New York, NY (US)

(72) Inventor: Benjamin Holtzman, New York, NY (US)

(73) Assignee: Strabo Engineering, LLC, New York, NY (US)

( * ) Notice: Subject to any disclaimer, the term of this patent is extended or adjusted under 35 U.S.C. 154(b) by 0 days.

(21) Appl. No.: 17/582,889

(22) Filed: Jan. 24, 2022

(65) Prior Publication Data

US 2022/0235612 A1  Jul. 28, 2022

Related U.S. Application Data

(60) Provisional application No. 63/140,439, filed on Jan. 22, 2021.

(51) Int. Cl.
  *E21B 7/18* (2006.01)
  *E21B 7/06* (2006.01)
  *E21B 36/00* (2006.01)
  *E21B 21/08* (2006.01)
  *E21B 21/10* (2006.01)
  *E21B 7/04* (2006.01)

(52) U.S. Cl.
  CPC .............. *E21B 7/18* (2013.01); *E21B 7/046* (2013.01); *E21B 7/065* (2013.01); *E21B 21/08* (2013.01); *E21B 21/10* (2013.01); *E21B 36/001* (2013.01)

(58) Field of Classification Search
  CPC . E21B 7/18; E21B 7/046; E21B 7/065; E21B 21/08; E21B 21/10; E21B 36/001
  See application file for complete search history.

(56) References Cited

U.S. PATENT DOCUMENTS

| 4,545,702 | A | 10/1985 | Sano et al. |
| 4,787,465 | A * | 11/1988 | Dickinson, III ........ E21B 47/01 175/67 |
| 5,771,984 | A | 6/1998 | Potter et al. |
| 6,530,439 | B2 * | 3/2003 | Mazorow .................. E21B 7/18 175/73 |
| 10,309,205 | B2 * | 6/2019 | Randall ............... E21B 41/0078 |
| 2011/0303460 | A1 | 12/2011 | Rudolf Von Rohr et al. |
| 2014/0054087 | A1 * | 2/2014 | Wang ........................ E21B 7/18 175/73 |

OTHER PUBLICATIONS

Written Opinion for International Serial No. PCT/US22/13545 dated Jan. 24, 2022, 7 pages, United States.

\* cited by examiner

*Primary Examiner* — Yong-Suk (Philip) Ro
(74) *Attorney, Agent, or Firm* — Thorpe North and Western LLP

(57) ABSTRACT

A spallation drill head can include a drill head body having a primary face substantially oriented facing in a primary drilling direction along a longitudinal axis of the drill head body. A liquid inlet can be on the drill head body. The liquid inlet can be connected or connectable to a liquid supply line. An internal liquid connection can be oriented within the drill head body and fluidly connected to the liquid inlet. A plurality of liquid jets can be oriented on the primary face of the drill head. The liquid jets can be fed by the liquid inlet through the internal liquid connection. A mass flow controller can be associated with the liquid jets to control delivery of liquid by the liquid jet, and flowrates to at least two of the liquid jets can be independently controllable.

25 Claims, 18 Drawing Sheets

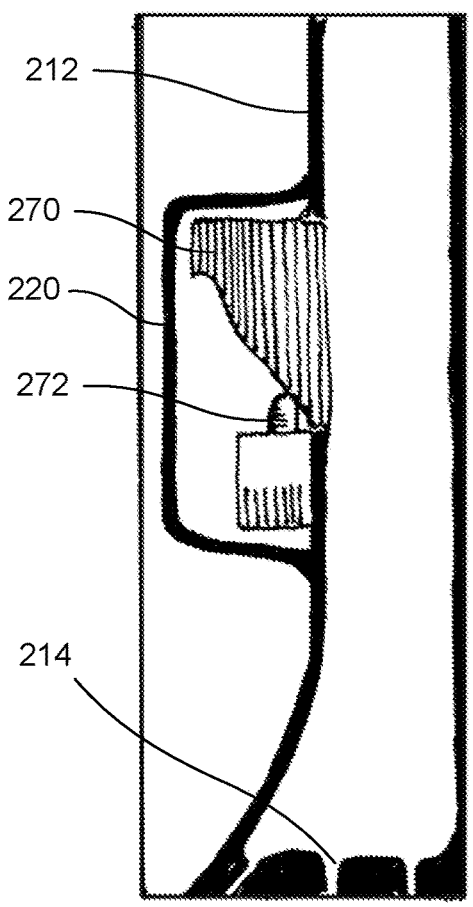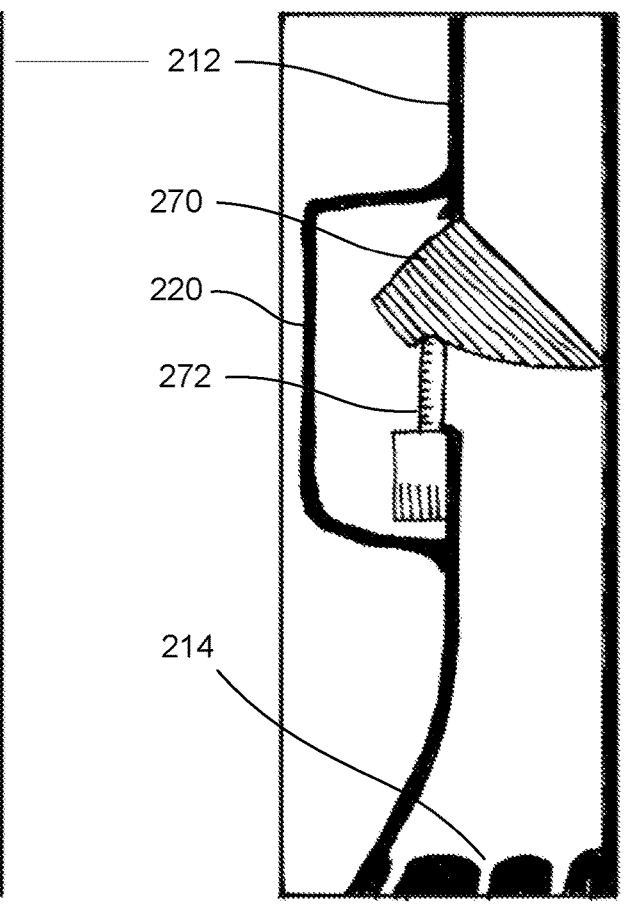
FIG. 10C　　　　　　　　FIG. 10D
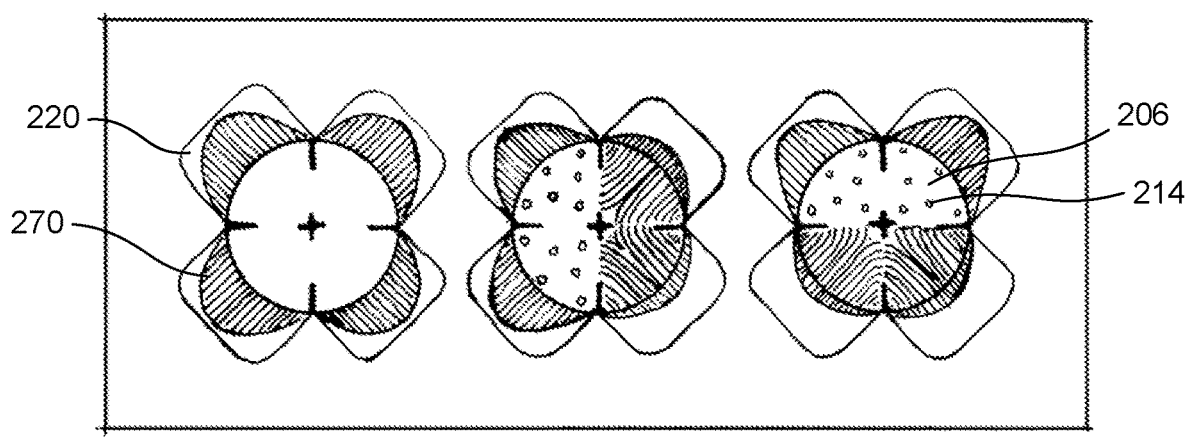
FIG. 10E

SPALLATION DRILL HEAD AND ASSOCIATED METHODS

RELATED APPLICATIONS

This application claims priority to U.S. Application No. 63/140,439, filed Jan. 22, 2021. This application also claims the benefit of U.S. application Ser. No. 17/316,562, filed May 10, 2021 which claims the benefit of U.S. application Ser. No. 16/940,281, filed Jul. 27, 2020 (now U.S. Pat. No. 11,029,062) which claims priority to U.S. Provisional Application No. 62/878,578, filed Jul. 25, 2019 which are each incorporated herein by reference.

BACKGROUND

Extraction of energy stored in the Earth's crust, from hydrocarbons to thermal energy, usually requires some form of borehole drilling. Thermal energy in the crust offers an effectively inexhaustible, carbon-free energy source that can be used to generate electricity, heat and cool buildings, desalinate water, produce hydrogen fuel and satisfy other human energy needs. However, production of electricity from geothermal energy (i.e. "geothermal power") is currently limited because of difficulties in reliably tapping large reservoirs, or volumes of the crust containing the targeted thermal energy density. Most economical geothermal power generation systems are located in unusual geologic settings with highly elevated crustal heat sources, such as volcanic intrusions, surrounded by cracked, permeable, fluid-saturated or steam-saturated rock that can be replenished by fluid injection. Extracting sufficient geothermal energy to generate electricity economically and reliably is often difficult due to intersections of geological complexity and current technical limitations. A major constraint is that many drilling methods currently in use have a limited depth range.

Increasing efficiency and economic predictability of geothermal energy extraction can be useful from several standpoints. Geothermal energy is a renewable source of dispatchable power with sufficient base load qualities to provide electric grid stability. Utilizing geothermal energy may also help to mitigate climate change concerns because the extraction process produces no carbon dioxide. In many processes for extracting geothermal energy, or "heat mining," a fluid is heated while percolating through a permeable fracture network in hot rock. Heated fluid re-emerges at the surface through holes drilled for fluid/vapor recovery. Where permeable fracture networks are not available, fracture networks can be created in "hot dry rock" (HDR), by hydraulic and thermal fracture methods. The drill holes and generated fracture networks in HDR are referred to as "enhanced geothermal systems" (EGS). Some limitations of current EGS methods result from the hydraulic fracture process, as it (1) can reactivate existing faults inducing significant earthquake seismicity (which is true for any geothermal reservoir system); (2) is difficult to control the geometry of the produced fracture network for enhancing the recovery; and (3) can produce relatively large cracks that act as high-flux fluid pathways where the available heat is rapidly diminished.

Another major limitation of EGS is that it becomes increasingly difficult to drill at greater depths because as the ambient temperature increases, the rocks' increased ductility suppresses the fracture formation necessary for the mechanical drilling process, along with other technical difficulties. Finally, a challenge with present EGS technologies is that almost all approaches involve drilling multiple boreholes from the surface, for either injection or production separately, expanding the drilling costs and uncertainty in the production of fracture networks to connect the injection and production boreholes. Despite advances in EGS and other geothermal technologies, challenges remain to cost-effective and reliable recovery of thermal energy from geothermal reservoirs to produce electricity. Furthermore, the efficiency of the wide range of turbine generators depends strongly on the temperature of the recovered fluid/vapor from the reservoir. That efficiency greatly increases when supercritical fluids can be extracted, making the deeper crust an optimal target. Geothermal power generation can expand greatly when it is possible to reliably access ubiquitous deep crustal heat sources.

SUMMARY

The current disclosure describes spallation drill heads and methods that can be used to drill boreholes for a variety of purposes. The physical basis of the drilling and fracturing process employed herein is to convert thermal energy to mechanical energy, creating the stress to drive fracture by rapidly changing the temperature of small volumes of rock with jets of fluid. The spallation drill heads can be used for cold spallation or hot spallation. The process of "cold spallation," refers to the process of using colder fluid to generate micro-fractures in relatively hotter rock. Cold spallation can be used to increase access to superhot geothermal reservoirs, often defined as >450° C. The process of "hot spallation" refers to the use of hotter fluid to generate micro-fractures in colder rock. The spallation drill heads described here can govern this process for a range of modes of operation, including drilling as well as creation of microcracks to increase permeability and fluid flow for heat extraction or other purposes. These spallation drill heads can help to reduce or eliminate the current limitations to accessing superhot geothermal resources.

In one example, a spallation drill head can include a drill head body. The drill head body can have a primary face that is substantially oriented facing in a primary drilling direction along a longitudinal axis of the drill head body. A liquid inlet can be on the drill head body. The liquid inlet can be connected or connectable to a liquid supply line. An internal liquid connection can be oriented within the drill head body and fluidly connected to the liquid inlet. a plurality of liquid jets can be oriented on the primary face of the drill head. The liquid jets can be fed by the liquid inlet through the internal liquid connection. A mass flow controller can be associated with the liquid jets to control delivery of liquid by the liquid jets. The flowrates of at least two of the liquid jets can be independently controllable. In some examples, this can allow the spallation drill head to be steerable by varying the amount of liquid flowing through different liquid jets.

In some examples, the drill head may not include a mechanical drill head oriented to drill in the primary drilling direction. In such examples, the drill head can drill in the primary drilling direction by non-contact cold spallation. However, in some alternatives one or more elements can be used to create mechanical damage on the rock face being drilled, to augment or reinforce primary spallation-driven rock removal.

In some examples, the spallation drill head can include a plurality of liquid jets. The liquid jets can be distributed in an array on the primary face of the drill head. In certain examples, a first portion of the plurality of liquid jets can be oriented in a different direction than a second portion of the plurality of liquid jets. Additionally, further examples can include valves that are fluidly connected to the plurality of liquid jets to independently control liquid flow to the liquid jets oriented in the different directions to allow steering the drill head by flowing more liquid through jets oriented in a desired direction. Such valves can be fluidly connected to a single liquid jet each, or can be fluidly connected to a subset of the plurality of liquid jets. This can allow for full independent operation of each jet or separate operation of multiple zones of jets, depending on balance of performance and complexity.

In further optional examples, the plurality of liquid jets can include at least four groups of liquid jets. These groups of liquid jets can be spatially segregated from one another. The flowrates to the individual groups can be independently controlled. Valves can be connected to the individual groups of liquid jets to independently control the liquid flow to the individual groups. This can allow steering of the drill head by flowing more liquid through at least one group of liquid jets than through at least one other group of liquid jets.

In another optional example, the liquid inlet of the spallation drill head can be the only inlet for liquid to be delivered to the rock such that only a single liquid can be delivered via the drill head.

In other examples, the mass flow controller of the spallation drill head can include a valve configured to produce a pulsed fluid flow through the liquid jets. In certain examples, the valve can be capable of stopping fluid flow through the liquid jets to allow temperature equilibration in rock surrounding the drill head.

The spallation drill head can include a liquid pump to increase the pressure in the liquid, in some examples. This liquid pump can be in fluid communication with the at least one liquid jet of the spallation drill head. The liquid pump can pressurize liquid jetted from the at least one liquid jet. In certain examples, the liquid pump can be located within the drill head body.

The spallation drill head can also include a chiller in some examples. The chiller can be located within the drill head body and associated with the internal liquid connection to chill liquid fed to the plurality of liquid jets. In some examples, the chiller can be a thermoelectric chiller. If the spallation drill head is to be used for hot spallation, then the spallation drill head can include a heater in some examples. The heater can be located within the drill head body and associated with the internal liquid connection to heat the liquid fed to the jets. In certain examples, the heater can be an electric heater.

In further examples, the spallation drill head can include a slurry extraction opening. The slurry extraction opening can be on the drill head body in a forward region of the drill head body. A slurry outlet can be on the drill head body in a rearward region of the drill head body which can allow transport of the slurry out of the borehole. The slurry outlet can be connected to the slurry extraction opening by an internal slurry connection within the drill head body. The slurry outlet can be connected or connectable to a slurry line. In still further examples, the spallation drill head can include a slurry pump associated with the internal slurry connection. The slurry pump can pump a slurry of fluid and rock fragments up the slurry line. In certain examples, the slurry extraction opening can be on a lateral face of the drill head body.

The spallation drill head can also include an actuatable sealing element on the drill head body between the slurry extraction opening and the slurry outlet, the sealing element being actuatable to temporarily seal a portion of a borehole forward of the sealing element from a portion of borehole rearward of the sealing element. In certain examples, the sealing element can be an inflatable packer on a lateral face of the drill head body. The inflatable packer can be inflated to cause the inflatable packer to expand and fill space between the lateral face of the drill head body and an interior face of a borehole so as to create a seal between segments of space between an outer surface of the drill head body and an inner surface of a rock face of the borehole. In some cases, the drill head body can have a cylindrical shape, and the inflatable packer can be shaped as an annular tube around a circumference of the drill head body. In further examples, the spallation drill head can also include a second inflatable packer shaped as an annular tube around a circumference of the drill head body and oriented adjacent the first inflatable packer.

In some examples, the spallation drill head can include wheels or another mechanism for both centering the apparatus in the borehole and for controlling mobility at a lateral face of the drill head body. The wheels or other mechanism can extend outward from the drill head body to an interior face of a borehole to propel the drill head in the borehole at a desired speed or to fix the drill head in place. These wheels can also provide some added lateral stability to the spallation drill head during use.

In some further examples, the spallation drill head can include at least one lateral liquid jet oriented on a lateral face of the drill head body. In still further examples, the at least one lateral liquid jet can include an array of lateral liquid jets distributed radially and longitudinally about the lateral face of the drill head body. These lateral liquid jets can be used to augment removal of debris, expand a width of the borehole, and/or create microfracture damage zones to enhance liquid-rock heat exchange.

In various examples, the spallation drill head can be a primary drill head, a secondary drill head launched from a primary drill head, a secondary drill head launched from a non-drill head base unit, or a tertiary drill head launched from a secondary drill head.

In another example, a spallation drill head can include a drill head body having a primary face substantially oriented facing in a primary drilling direction along a longitudinal axis of the drill head body. A liquid inlet on the drill head body can be connected or connectable to a liquid supply line. An internal liquid connection can be oriented within the drill head body and fluidly connected to the liquid inlet. At least one liquid jet can be oriented on the primary face of the drill head. The at least one liquid jet can be fed by the liquid inlet through the internal liquid connection. A mass flow controller can be associated with the at least one liquid jet to control delivery of liquid by the at least one liquid jet. A slurry extraction opening can be on the drill head body in a forward region of the drill head body. A slurry outlet can be on the drill head body in a rearward region of the drill head body. The slurry outlet can be connected to the slurry extraction opening by an internal slurry connection within the drill head body. An actuatable sealing element can be on the drill head body between the slurry extraction opening and the slurry outlet. The sealing element can be actuated to temporarily seal a portion of a borehole forward of the sealing element from a portion of the borehole rearward of the sealing element.

In certain examples, the actuatable sealing element can include an inflatable packer on a lateral face of the drill head body. Inflating the inflatable packer can cause the inflatable packer to expand and fill space between the lateral face of the drill head body and an interior face of a borehole. The drill head body can have a cylindrical shape and the inflatable packer can be shaped as an annular tube around a circumference of the drill head body. In other examples, the drilling head can include a slurry pump associated with the internal slurry connection to pump a slurry of liquid and rock fragments up the slurry line. Additionally, the slurry extraction opening can be on a lateral face of the drill head body.

The present disclosure also describes methods of spallation drilling. Thermal spallation occurs by converting thermal energy into mechanical energy by activating the thermoelastic properties of rock. Thermally shocking a hot rock surface with cold fluid causes the rock to contract over a strong thermal gradient that extends a certain distance into the rock, oblique to the rock face, resulting in local tensional stresses that cause micro-cracking over a small thickness into the rock. This layer of cracking rock can be called the "spalling layer". The thickness of this layer is determined by transfer of heat from the rock into the fluid by multiple mechanisms, which are coupled to the cracking process through thermo-elastic coupling as well as non-linear effects due to the dependence of thermal, mechanical and transport properties on the locally changing crack density and geometry. Heat can be transferred in this layer by conduction through the solid and conductive transfer from crack surfaces to fluid percolating and convecting through cracks. At extreme thermal disequilibrium, multiple heat transfer modes may be accessed, including microfluidic processes and in some cases radiative transfer between fluid and rock. Hydraulic pressure from the fluid can also drive cracks further into the rock. Furthermore, the pressure (or mean stress) in the rock will form a sharp gradient near the spalling rock face, ranging from approximately the lithostatic pressure to a value closer to the hydrostatic pressure, over some length scale that maybe different from but coupled to the thermal gradient. The process will be most effective with numerous small cracks (micro-cracks) that lead to spallation, or removal of those crack-bounded rock fragments from the rock surface and into suspension in the fluid. The process can be hindered if cracks penetrate into the rock face but do not lead to fragments detaching from that surface. Effective spallation exposes a relatively hot surface below the spallation layer, to become the new spallation layer. The methods described herein can include maintaining a sharp thermal gradient and the resulting stress gradient in the rock to drive micro-fracturing and spallation. In particular examples, the methods can include controlling sufficient degrees of freedom to maintain that sharp temperature and stress gradient, and also to remove the spallation debris (slurry) from the rock face. These sub-processes (thermal diffusion, radiative heat transfer from rock to fluid, thermal and hydraulic crack propagation, fluid flow to remove slurry) may have multiple time scales to be reconciled and tuned.

In one example, a method of spallation drilling can include placing a spallation drill head in a borehole. The spallation drill head can include a plurality of liquid jets. The method can further include jetting liquid from the fluid jets onto rock of the borehole. The liquid can have a temperature different from a temperature of the rock with a sufficient temperature difference that the jetting the liquid causes thermal fracturing in a certain depth extending into the rock from the drilling surface, forming fractures in the rock, thereby forming loose rock fragments through a combination of thermal fracturing and liquid pressure. The flow of at least one liquid jet can be controlled independently from at least one other liquid jet such that different amounts of liquid are jetted from the independently controlled liquid jets. This can cause different amounts of fracturing in different parts of the rock. The liquid and loose rock fragments can be removed from the borehole as a slurry, exposing a less fractured and hotter layer of the rock to the liquid jets. The liquid pressure can also drive liquid into the cracks and cause further crack propagation.

In some examples, the liquid can be jetted in pulses separated by a sufficient time to allow a cooled rock surface to reheat up to a sufficient temperature to be fractured by a subsequent pulse of cooler liquid. Liquid momentum (mass times velocity) hitting the rock surface and the temperature difference between the liquid and the rock controls the cracking rate. The method can include controlling the liquid mass flux over time, and to some extent, the temperature difference. The jetting can be maintained at a constant liquid mass rate, or turned on and off, controlled in pulses or oscillations of chosen durations and gaps of zero or reduced liquid mass rate. These choices contribute to thermal shock on the spallation interface and thermal gradient from that interface into the rock. If the interface is overcooled and cracking stops, jetting can be stopped for a sufficient duration to allow the rock surface to reheat. The durations of these different phases can range from seconds to days depending on native thermal energy, rock characteristics, and other factors. The design of the apparatus can enable the control and maintenance of this thermal/mechanical gradient.

The temperature difference between the liquid being jetted and the rock can be from about 50° C. to about 800° C., and in some cases 200° C. to 500° C. In some examples, the liquid being jetted can be colder than the rock. For example, the liquid being jetted can have a temperature from about 0° C. to about 100° C., and in some cases from about 20° C. to about 90° C.

The liquid jets can be pulsed using a valve that is configured to adjust fluid flow through the liquid jets, in some examples.

In further examples, the liquid can be chilled before the fluid is jetted. In some particular examples, the chilling can be performed by thermoelectric chilling, or by a heat exchanger containing a separate cold working fluid, within the drill head.

In certain examples, the drill head can drill in the primary drilling direction by non-contact cold spallation, meaning that the drill head does not contact the rock being fractured.

The method can include steering the drill head to form a curved borehole.

In still further examples, the plurality of the liquid jets can be on a primary face of the drill head. The primary face can be substantially oriented facing in a primary drilling direction. In certain examples, at least some of the liquid jets can be oriented in a different direction than at least some other liquid jets. The drill head can be steered by flowing more liquid through jets oriented in a desired direction to allow small rotations of the drill head, leading to a directional change in the borehole.

The liquid jetted from the liquid jets can be pressurized in some examples using a dedicated liquid supply pump. In other cases, the liquid jets can be pressurized via hydrostatic pressure.

In further examples, the slurry can be removed through a slurry extraction opening on the drill head.

The pressure of the liquid can be controlled after the liquid has been jetted onto the rock by sealing the borehole with an actuatable sealing element on the drill head body, the sealing element being actuatable to temporarily seal a portion of the borehole forward of the sealing element from a portion of the borehole rearward of the sealing element. In certain examples, the sealing element can comprise an inflatable torus-shaped (like a tire inner-tube) packer (for example, as used in hydraulic fracturing devices, but adapted to high temperature conditions) between a lateral face of the drill head and an interior face of the borehole. This system of packers and valves can isolate a volume containing the fluid jetted onto the rock. In some examples, the method can also include inflating a second inflatable packer between a lateral face of the drill head and an interior face of the borehole. Alternative sealing elements can also be used which protrudes sufficient to compress against the wall rock of the borehole to create a seal or greatly constricted flow.

In certain examples, liquid can be jetted from at least one lateral liquid jet in a lateral direction that is substantially perpendicular to the primary drilling direction.

In various examples, the drill head can be a primary drill head, a secondary drill head launched from a primary drill head, a secondary drill head launched from a non-drilling base unit, or a tertiary drill head launched from a secondary drill head. The drilling can be in a lateral direction, and in certain examples the borehole can be a secondary borehole extending laterally off of a vertical primary borehole.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIGS. 10C and 10D are cross-sectional side views of a control valve in the steering mechanism of FIG. 10B;

FIG. 10E shows cross-sectional views from below of the steering mechanism of FIG. 10A with various arrangements of open and closed control valves;

Figure 1:
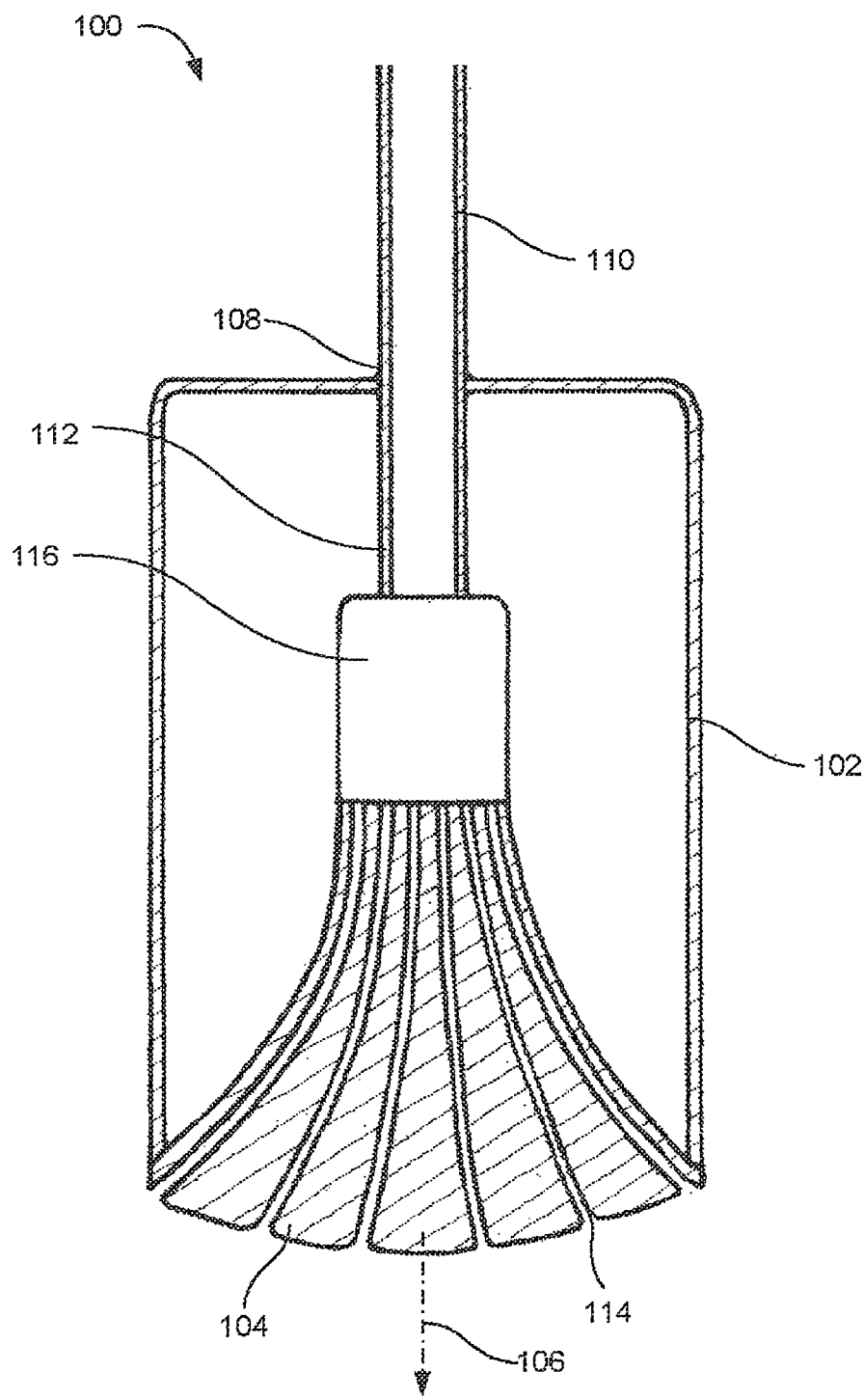
FIG. 1 is a schematic illustration of an example spallation drill head in accordance with an embodiment of the present invention

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The term "geothermal" is used to refer to any thermal energy present under the surface of the Earth. Geothermal energy can be stored in rock at a wide range of temperatures and pressures, which can be present over a wide range of depths under the surface of the Earth.

As used herein, a "geothermal reservoir" refers to a region under the surface of the Earth that has a sufficiently high temperature (or thermal energy density) to allow useful heat energy to be produced and extracted from the region. Typically, the geothermal reservoir can be natively heated or in other words contains thermal energy flowing from Earth's deep interior towards the surface, rather than introduced from a surface heat source. Geothermal reservoirs can include rock with fluid present in fractures and/or other forms of porosity, or without such porosity ("wet" or "dry", respectively). For example, wet geothermal reservoirs can include underground hydrothermal systems or hot wet rock (HWR) at a sufficiently high temperature to produce heat energy therefrom. Dry geothermal reservoirs can include hot dry rock (HDR), which can be a rock formation containing little or no fluid. The systems described herein can be effectively used in either HWR or HDR. Lateral borehole embodiments can be used to access heat adaptively in either HWR or HDR (or mixed/permeability and fluid content varying in time and space). In either case, this system may be implemented over a wide range of target temperatures, but is intended in particular for use in geothermal reservoirs at high temperature targets (>350° C.), or "superhot" conditions (>450° C.). The relevant physics is described below. Although this system can be particularly useful in electricity generation, other applications can include but are not limited to, energy storage through production of hydrogen fuel (for example, by electrolysis), direct production of steam, direct heating, and the like, and also mining of metals dissolved in hydrothermal fluids, such as lithium (known as "direct lithium extraction").

As used herein, "thermal contact" can refer to a functional connection between two objects or fluids that allows heat transfer to occur from one object or fluid to the other. In some examples, thermal contact can be established by direct, physical contact. For example, water injected directly into fractures in a hot dry rock formation can be in thermal contact with the hot dry rock because heat is transferred from the hot dry rock to the water while they are in direct physical contact. In other examples, thermal contact can be established without direct physical contact, but where an intermediate medium is present that can conduct heat. For example, water can be enclosed within a pipe that is in physical contact with the hot dry rock. The water can be in thermal contact with the hot dry rock because heat can be conducted from the hot dry rock, across the pipe wall, to the water without direct physical contact between the water and hot dry rock.

As used herein, "fluidly connected" can refer to bodies of fluids, fluid lines, or fluid containers that are connected physically in a way that allows mass transfer of fluids from one to another. Similarly, "fluidly isolated" can refer to bodies of fluid, fluid lines, or fluid containers that are separate so that no fluid can be transferred from one to another.

As used herein, "spallation" refers to a process of separating rock fragments from a rock body. Spallation can include thermal spallation, in which thermal expansion or contraction is utilized to fracture rock (or other solid material, such as concrete or metal) and separate fragments of rock from a formation. "Hot spallation" can be achieved with flames, plasmas or lasers to heat a rock face. When fluids are used to heat or cool the rock, the process is referred to as "hydrothermal spallation." "Cold hydrothermal spallation" or simply "cold spallation" refers to the reverse temperature difference in which cold fluid comes into contact with hot rock. In both cases, the thermal shock causes thermal expansion or contraction of the rock, creating compressional or tensional stresses in the rock, respectively, causing microfractures to form. In some examples, cold spallation can be particularly useful in geothermal formations. The cold spallation process can be performed by rapidly reducing the temperature of hot geothermal rock so that the rapid thermal contraction causes microcracks or fractures to form, penetrating into the rock a short distance from the surface of the rock. In some examples, a cold fluid can be jetted onto the rock to cause this rapid decrease in temperature. Fragments of rock can be separated and removed by a combination of the fracturing due to rapid contractions in combination with the pressure and momentum of the fluid. Spallation is a rapid conversion of thermal to mechanical energy at a level sufficient to cause local cracking and removal of cracked material.

As used here, "mass flow controller" can refer to a mechanism or device that causes a controlled delivery of fluid from one reservoir to another, as part of a system to control fluid fluxes and fluid pressures. Such reservoirs can also constitute parts of a spallation drill head. In some examples, mass flow controllers can include a valve, multiple valves, a pump, multiple pumps, or a combination thereof. The controlled delivery can include constant fluid flow, pulsed flow, intermittent flow, etc. Characteristics of pulsations can vary, but in some examples pulsing the fluid delivery can involve a repeated increase and decrease in the flow rate of the fluid being delivered by the spallation drill head. In some examples, the flow of fluid can be completely shut off between pulses, while in other examples the flow can merely be reduced to a lower flow rate between pulses of a higher flow rate.

As used herein, whenever any property is referred to that can have a distribution between differing values, such as a temperature distribution, pore size distribution, etc., the property being referred to represents an average of the distribution unless otherwise specified.

It is noted that, as used in this specification and in the appended claims, the singular forms "a," "an," and "the" include plural referents unless the context clearly dictates otherwise. Thus, for example, reference to "a layer" includes one or more of such features, reference to "a particle" includes reference to one or more of such elements, and reference to "producing" includes reference to one or more of such steps.

As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context. However, unless otherwise enunciated, the term "about" generally connotes flexibility of less than 2%, and in some cases less than 1%, and in other cases less than 0.1%.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained. "Substantially" refers to a degree of deviation that is sufficiently small so as to not measurably detract from the identified property or circumstance. The exact degree of deviation allowable may in some cases depend on the specific context. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context. Additionally, adjacent structures or elements can in some cases be separated by additional structures or elements between the adjacent structures or elements.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Furthermore, various modifications and combinations can be derived from the present disclosure and illustrations, and as such, the following figures should not be considered limiting.

Spallation Drill Heads

The present disclosure describes spallation drill heads that can be used for drilling boreholes in rock. In particular examples, the spallation drill heads can be useful for drilling boreholes in geothermal rock formations. At high temperatures, rocks become ductile; the temperature range over which that transition occurs depends on the composition and microstructure (properties such as the distribution of grain sizes) of the rock, as well as the rate of deformation. Mechanical drilling can become less effective as rock becomes more ductile. Rock temperature can often increase with depth of a borehole, such that when the borehole enters a target geothermal reservoir, mechanical or hot spallation or other methods become less effective if the rocks in that target depth can have significant ductile behavior. As an example, when the rock temperature reaches about 50% to 70% of its melting temperature, the rock can be in a so-called "semi-brittle" regime, undergoing a brittle-ductile transition. The temperature at which rock becomes predominantly ductile can vary depending on a multitude of factors, including the rock composition, pressure, water or other fluid content, aspects of the microstructure such as grain size, and the rate of deformation. For example, granitic rocks with small amounts of water present can melt at around 650-700° C. between 5-10 km depths, so their brittle-ductile transitions may begin at about 325° C. Regardless, at temperatures at and above this brittle-ductile transition, cold spallation drilling can be particularly effective. Because rocks have lower range of yield stress in tension than in compression, and cold spallation operates by causing thermal contraction, cold spallation may occur easily. Cold spallation can begin to work at temperatures high enough for the rapid temperature drop upon cold fluid contact to produce thermal stress to the level of a critical stress at which cracking occurs. This temperature may be significantly cooler than the brittle ductile transition. Therefore, the regimes at which mechanical drilling and cold hydrothermal spallation drilling are effective may overlap significantly. A borehole can be drilled from the surface using mechanical or other means to a depth at which cold hydrothermal spallation drilling could begin.

A cold spallation drill head can include a jet for jetting cold fluid, such as water, onto the geothermal rock. Jetting cold water onto the hot rock can cause a thin layer of the rock to cool and contract very quickly, which can create small-scale fractures in the rock. In some cases, the fractures can cause particles of rock to break off. In certain examples, the cold fluid can be pressurized to a high pressure, which can drive the fluid into the fractures and help propagate the fractures, enhancing the spallation process. These fragments and particles can be removed from the borehole via a slurry line in some examples. In further examples, a combination of cold fluid jets and mechanical force can be used. For example, cold fluid can be jetted on the rock to form fractures and then the drill head can use rotary motion or percussive force to break the fractured rock, or alternatively, mechanical force can cause small degrees of damage to the rock before a thermal shock is applied, in order to provide more nucleation points for thermal-hydraulic cracking to begin.

Cold fluid jets can also be pulsed or cycled. The temporal control of fluid flux can maintain an optimal or near-optimal thermal/stress gradient in the spallation layer, drive further cracking where desired, and clear out the slurry. In the situation that the drilling target becomes over-cooled, the flow could be stopped to allow thermal conductivity to reheat that layer of rock. Reheating can enable the necessary thermo-mechanical gradient to be re-established, and spallation drilling to resume.

The fluid can also be pulsed with increasingly higher pressures. Alternatively, the fluid jet can be pulsed at a high pulse frequency so that time is not allowed for the rock deeper than a shallow layer to become cooled. A shallow layer of rock contacted by the cold fluid can become fractured, and the fracture rock can be removed and another pulse of cold fluid can be jetted before the underlying hot rock has sufficient time to cool down. Thus, the cold fluid can continuously be jetted onto hot rock so that the temperature difference is sufficient to form fractures in the hot rock. The temperature and pressure in the portion of the borehole below the drill head, where spallation is occurring (referred to herein as a "spallation chamber"), can also be controlled by the rate of fluid evacuation out of the spallation chamber, which can be determined by the use of slurry outlet valves and a slurry outlet pump.

In other examples, hot hydrothermal spallation can be used. For example, pressurized fluid at a higher temperature than the rock can be used. For example, initial shallow regions of rock may be at relatively low temperatures in which case a hot hydrothermal spallation drilling can be useful until temperatures increase sufficiently to make cold spallation drilling more efficient. The pressurized fluid can cause fractures to open and propagate, and eventually connect to adjacent growing fractures, thereby spalling off small rock fragments, and removing that fractured material as a slurry to expose a new rock surface. This hot spallation drilling mode may be useful in drilling in relatively shallow, lower temperature crustal regions, prior to reaching hotter geothermal regions.

In both cold spallation and hot spallation drilling, the methods described herein can involve jetting a fluid (cold or hot relative to adjacent rock) onto rock. The methods can include jetting only a single fluid onto the rock in some examples. In other words, the method does not involve jetting multiple different fluids onto the rock at different times or at different locations. Instead, a single fluid can be jetted onto the rock in various jetting patterns, such as a pulsed pattern or a continuous pattern. In some examples, the fluid that is jetted can be a mixture of multiple components, in order to achieve certain physical properties such as viscosity, heat capacity, freezing point or other properties. In certain examples, the fluid can be water, alcohol, propylene or ethylene glycol, or an aqueous solution.

Spallation drill heads can also be configured to be steerable. In some examples, the spallation drill head can include a number of fluid jets oriented in different directions at angles with respect to a borehole axis. To steer the drill head, the fluid jets pointing the desired direction can be used to preferentially remove rock in that particular direction. This can change the direction of the borehole and steer the drill head. Although rates of direction changes and resulting radius of curvature can vary, such changes in direction are most often measured in terms of tens to hundreds of meters or yards.

In certain examples, the spallation drill heads described herein can be used in a geothermal heat mining device as described in U.S. Pat. No. 11,029,062, which is incorporated herein by reference. The geothermal heat mining devices can include a primary drill head for drilling a primary borehole, and/or secondary drill heads for drilling secondary boreholes, and/or tertiary drill heads for drill tertiary boreholes. The spallation drill heads described herein can be useful as any of the primary, secondary, or tertiary drill heads that are used with these geothermal heat mining devices. Even without the inclusion of these specific geothermal heat mining devices, the spallation drill heads described herein can be used to drill primary boreholes, secondary boreholes that branch off from primary boreholes, and/or tertiary boreholes that branch off from secondary boreholes.

With this more general description in mind, FIG. 1 shows a cross-sectional schematic view of one example of a spallation drill head 100 in accordance with the present disclosure. The spallation drill head includes a drill head body 102 having a primary face 104 that is substantially oriented facing in a primary drilling direction 106 along a longitudinal axis of the drill head body. In this figure, the primary drilling direction is downward toward the bottom of the figure. This can also be referred to as the forward direction because this is the direction in which the drill head travels as it drills through rock. Thus, the primary face of the drill head body is the bottom face in this figure. The spallation drill head also includes a liquid inlet 108 on the drill head body. In this example, the liquid inlet is on the top surface, opposite of the primary surface, of the drill head body. This can also be referred to as the rearward surface because it is opposite from the direction of travel of the drill head when the drill head is drilling through rock. The liquid inlet is connected to a liquid supply line 110. The liquid inlet is also connected to an internal liquid connection 112 that is within the drill head body. Several liquid jets 114 are oriented on the primary face of the drill head. These liquid jets are fed by the liquid inlet through the internal liquid connection. A mass flow controller 116 is oriented within the drill head body and associated with the liquid jets. The mass flow controller can selectively control liquid flow such as to pulse the delivery of liquid by the liquid jets. As previously described, such flow control can be a common flow to all of the jets, individual control of each jet, or separate control of multiple subsets of jets (i.e. independently controlled zones). The example spallation drill head shown in FIG. 1 can be used for cold spallation or hot spallation drilling. It is noted that several examples described herein focus on cold spallation drilling, but that any of the examples and features described for cold spallation drill heads can also be used or adapted for hot spallation drill heads.

Figure 2:
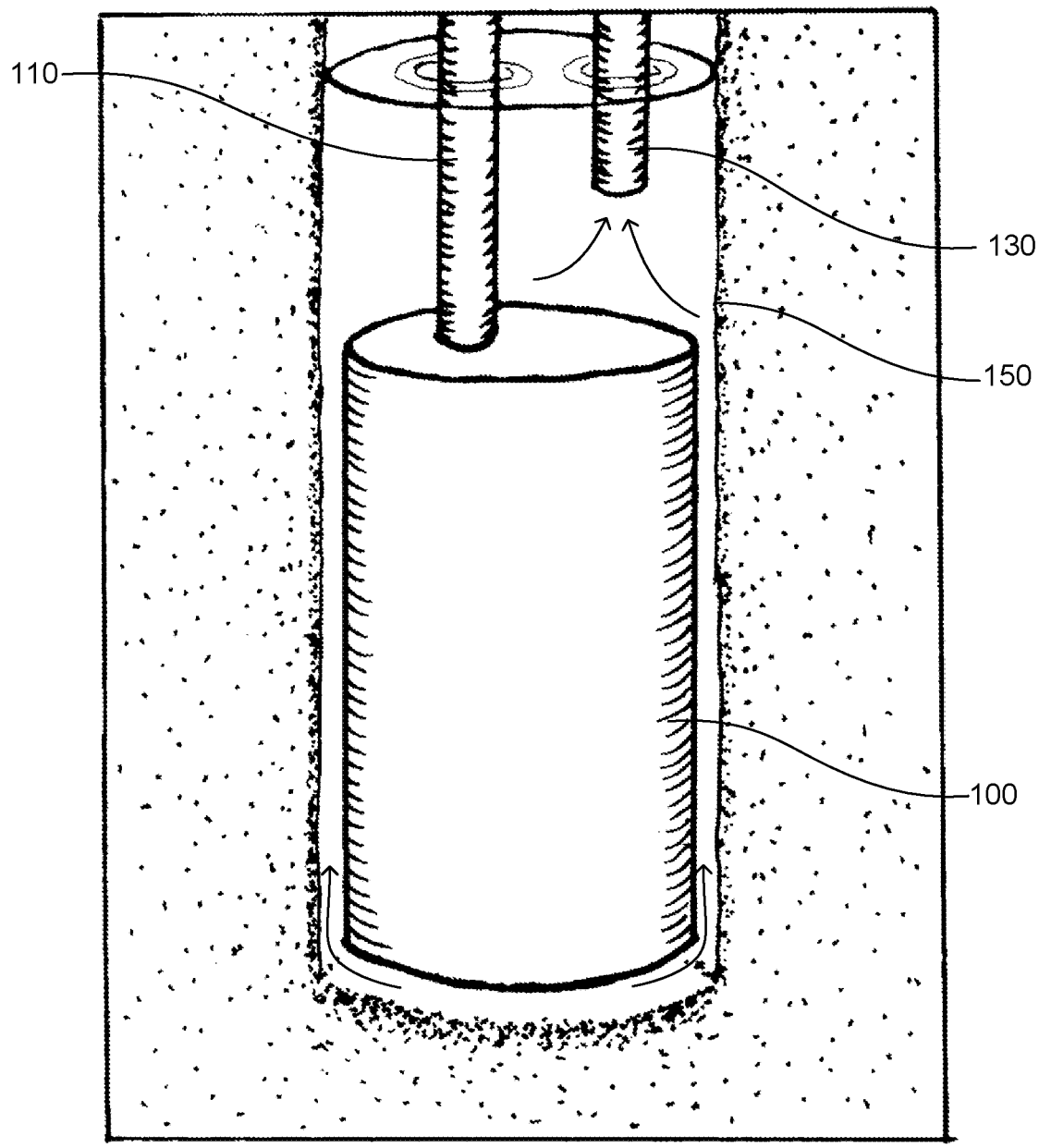
FIG. 2 is a perspective view of an example spallation drill head in accordance with an embodiment of the present invention.

FIG. 2 shows an example of a spallation drill head 100 positioned in a borehole 150. The drill head 100 can be connected to a cold liquid supply line 110. The cold liquid supply line extends up the borehole to the surface, where a cold liquid valve is located. This valve can control the flow of cold liquid down the supply line to the drill head. In one example, the liquid in the cold liquid supply line can naturally have a high hydrostatic pressure because the drill head can be deep below the surface (e.g. hundreds of meters to multiple kilometers). The high pressure liquid can fracture the rock around the drill head and form a slurry of liquid and rock pieces. The slurry can then slide between the sides of the drill head and the borehole walls, and rise to the surface or be pumped to the surface. In further examples, a cold liquid pump can be used to provide a higher pressure for the cold liquid so that the liquid jetted from the liquid jets can be at a higher pressure. FIG. 2 also shows a slurry line 130 extending from the spallation drill head to the surface. A slurry pump can be located at the surface to help pump the slurry of liquid and rock fragments up the slurry line.

Figure 3:
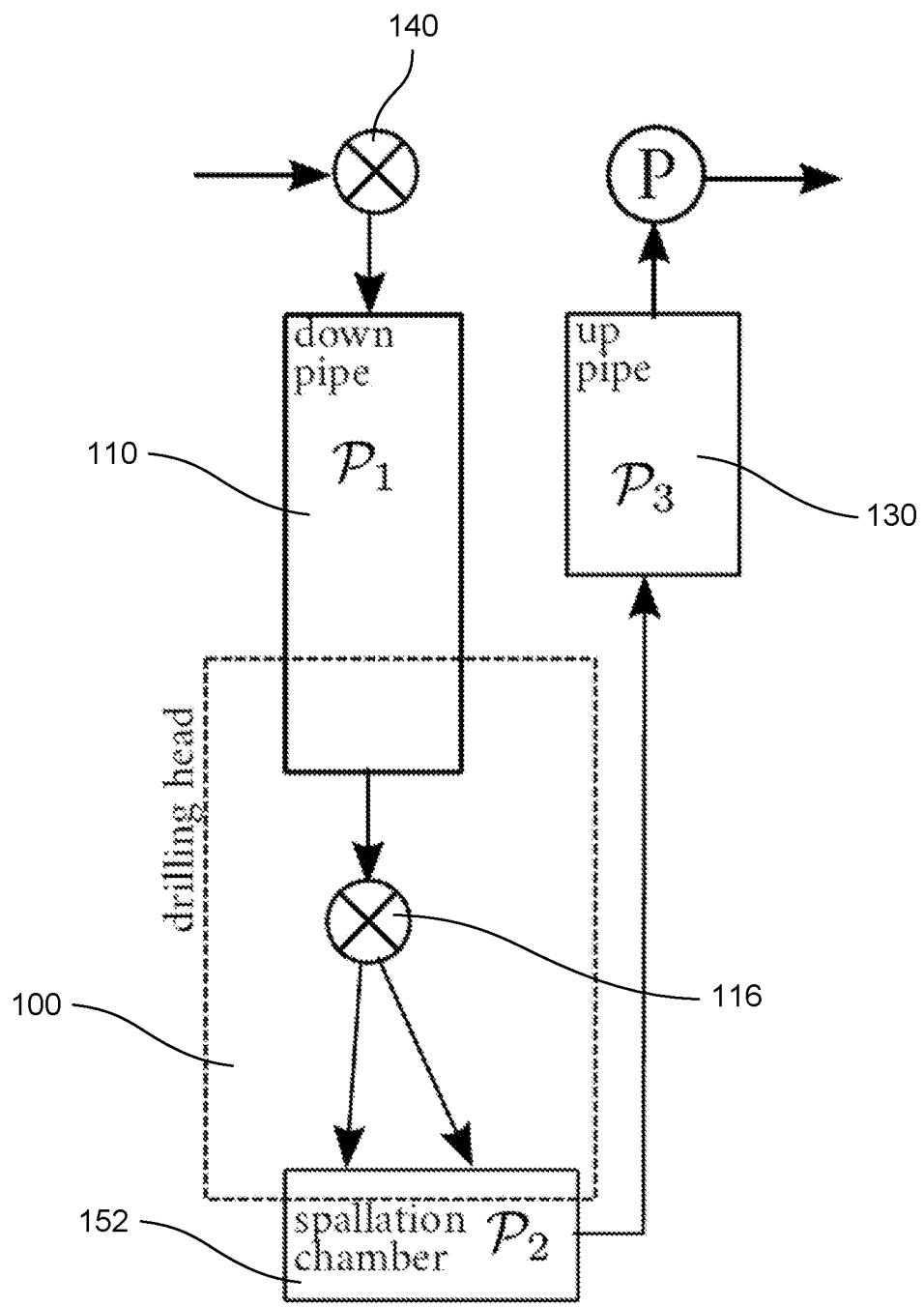
FIG. 3 is another schematic illustration of an example spallation drill head in accordance with an embodiment of the present invention.

FIG. 3 is a schematic drawing of a similar spallation drill head 100. This example includes a cold liquid supply line 110 ("down pipe") leading from the surface to the drill head. A cold liquid valve 140 at the surface can be opened to allow cold liquid to flow down the cold liquid supply line. A mass flow controller 116 is inside the drill head. In this example, the mass flow controller is a valve. This valve can be opened to allow liquid to flow out of the liquid jets of the drill head. The volume beneath the liquid jets is referred to as the spallation chamber 152. The liquid from the jets can fracture rock in the borehole to form slurry. The slurry can then slide up in the space between the drill head and the borehole wall to the slurry line 130 ("up pipe"). In this figure, three separate volumes are represented as reservoirs with individual pressures $P_1$, $P_2$, and $P_3$. In this example, the pressure in the cold liquid supply line is higher than the pressure in the spallation chamber, which is higher than the pressure in the slurry line.

A variety of fluids can potentially be jetted by the fluid jets in the spallation drill head. In some examples, the fluid can be water. Accordingly, the cold fluid supply line can supply cold water in some examples. Although water can be particularly effective and available, more dense fluids can also be useful to increase the momentum for a given fluid velocity, to increase spallation rate. Fluids having a higher heat capacity can also be useful to chill the rock more effectively. Optionally, small suspended particles can increase fluid viscosity and heat capacity as solid enhancement particles. Generally, additives may also be used in some implementations. Non-limiting examples of suitable additives can include anti-scale agents, foaming agents, tracers, enhancement particles, proppants, and the like. Furthermore, the fluid can be a liquid, supercritical fluid, or the like.

Figure 4:
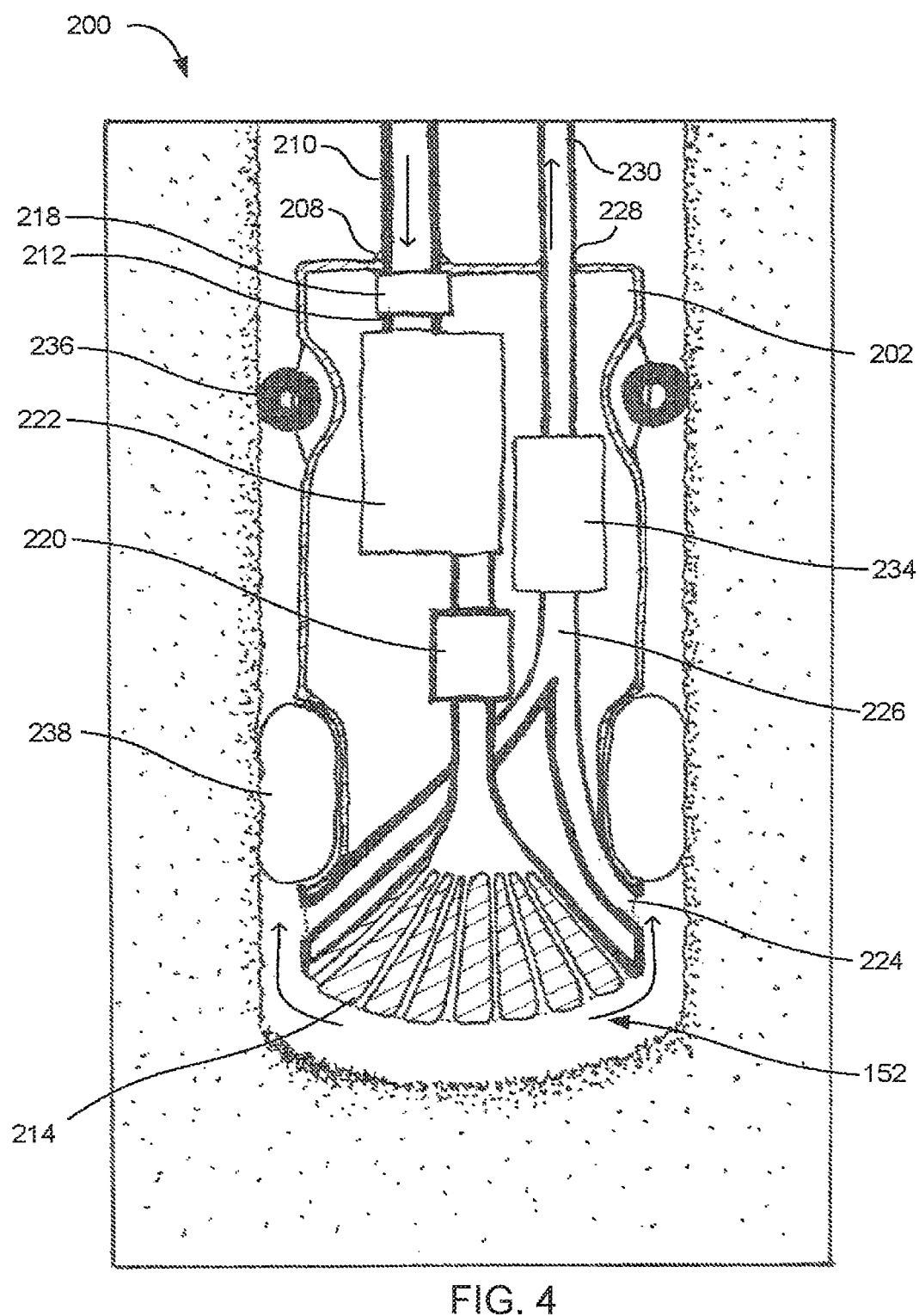
FIG. 4 is another schematic illustration of an example spallation drill head in accordance with an embodiment of the present invention.

FIG. 4 shows a cross-sectional view of another example spallation drill head 200. This example includes several additional components. As in FIG. 1, this example includes a drill head body 202, a liquid inlet 208, a liquid supply line 210, an internal cold liquid connection 212, liquid jets 214, and a mass flow controller. In the example of FIG. 4, the mass flow controller includes a combination of multiple valves. A main valve 218 is located on the internal cold liquid connection to adjust the flow of cold liquid through the drill head as a whole. A steering valve 220 is also shown connected to the liquid jets. The steering valve can allow for the flow of liquid to subsets of liquid jets to be adjusted independently. Additionally, any or all of these valves can be used to pulse the liquid delivery. The example shown in FIG. 4 also includes a chiller 222 in line with the internal cold liquid connection. This chiller can be a thermoelectric chiller in some examples. The chiller can ensure that the liquid is at a sufficiently low temperature before the liquid is jetted onto hot rock to fracture the hot rock. However, it is noted that in some examples the liquid can be above the freezing temperature of water.

Additional components in the example of FIG. 4 include slurry extraction openings 224 on a lateral face of the drill head body. The slurry extraction openings are connected to an internal slurry connection 226 leading to a slurry outlet 228 on the drill head body. A slurry line 230 is connected to the slurry outlet to carry slurry to the surface. The slurry extraction openings can be used to collect the slurry of liquid and spalled rock fragments formed during drilling. This example also includes a slurry pump 234 located on the internal slurry connection to pump slurry up the slurry line.

FIG. 4 also shows wheels 236 on a lateral face of the drill head body. The wheels can perform any or all of the following functions: (1) centralizing the drill head in the borehole, (2) locking the drill head in place in the borehole, and (3) propelling and steering the drill head. The wheels extend outward from the drill head body to an interior face of the borehole. The wheels can be spring-mounted to act as a borehole centralizer. In other examples, a standard spring-based "borehole centralizer" method can be used. In certain examples, the wheels can be hydraulically driven using energy from the liquid flowing down the cold liquid supply line. An energy transfer mechanism such as a turbine can be used to drive the wheels using energy from the flowing liquid. In other examples, the wheels can be driven by electric motors or in another way. In a further examples, the wheels may not be driven at all, but the force of gravity on the drill head can be used to propel the drill head downward. Alternatively, the drill head can be pushed downward from the surface, such as by connecting the drill head to the surface by a rigid line and pushing the rigid line downward from the surface. In further examples, the wheels can include a braking mechanism to lock the wheels in place, to hold the drill head stationary if desired. In other examples, a separate mechanism can be used to lock the drill head in place, such as retractable rods or spikes. Holding the drill head stationary can be useful in some cases when the liquid jets are being operated, so that high pressures generated by the liquid jets can be contained beneath the drill head without pushing the drill head upward.

The example shown in FIG. 4 also includes an inflatable packer 238. The inflatable packer can have the form of an inflatable annular ring or torus around the circumference of the drill head body. The inflatable packer can also be elongated parallel to the length of the drill head. The inflatable packer can be inflated to cause the packer to expand and fill space between the drill head body and the interior face of the borehole. When the packer is expanded in this way, it can form a seal with the borehole. The seal can help contain high pressures generated by the fluid jets and contain expansion of the working fluid as it heats up, to maintain it as a supercritical fluid. Thus, the pressure within the spallation chamber 152, or the volume in the borehole below the drill head, can be controlled. As a general guideline, pressure in the spallation chamber may be controlled 5-10% below the hydrostatic pressure, but may be transiently as much as 50% below or 100% or more above the hydrostatic pressure, but less than the lithostatic pressure. For example, at 10 km, the lithostatic pressure is approximately 265 MPa, and the hydrostatic pressure is approximately 100 MPa; while at 20 km, the lithostatic pressure is approximately 530 MPa, and the hydrostatic pressure is approximately 200 MPa.

In some examples, the seal can be improved by adding a second inflatable packer adjacent to the first inflating packer. In some examples, the inflatable packers can include an inflatable inner tube that can be inflated using a fluid such as air or liquid. In some cases, the liquid that is supplied by the cold liquid supply line can be used to inflate the packers. In further examples, the inner tubes can be protected by an outer layer made of a wear-resistant material. In one example, a sleeve of Kevlar or carbon fiber fabric can surround the inner tube for protection. In other examples, a rigid seal can be placed over the inner tube. The rigid seal can be made from rubber, silicone, plastic, metal, or another material that can withstand a sufficient range of temperature, pressure and wear, and can increase its diameter from that of the drill head body to that of the borehole. When the packers inflate, the rigid seal can be pressed against the interior face of the borehole to seal the borehole. Although the seal formed by the inflatable packers may prevent all fluid from passing the packers, some minor leakage can often be acceptable as long as target pressures are maintained within the sealed annular volume. As an example, maximum target pressures can be 20% below, and transiently 100% above, the hydrostatic pressure, a pressure at the bottom of the inflow pipe into the apparatus consistent with the peak ranges above. In some examples, the drill head can be locked stationary in the borehole before inflating the packers. The drill head can be locked in place using brakes or another mechanism, as explained above. The packers can be deflated before the drill head is unlocked to move the drill head further down the borehole.

Figure 5:
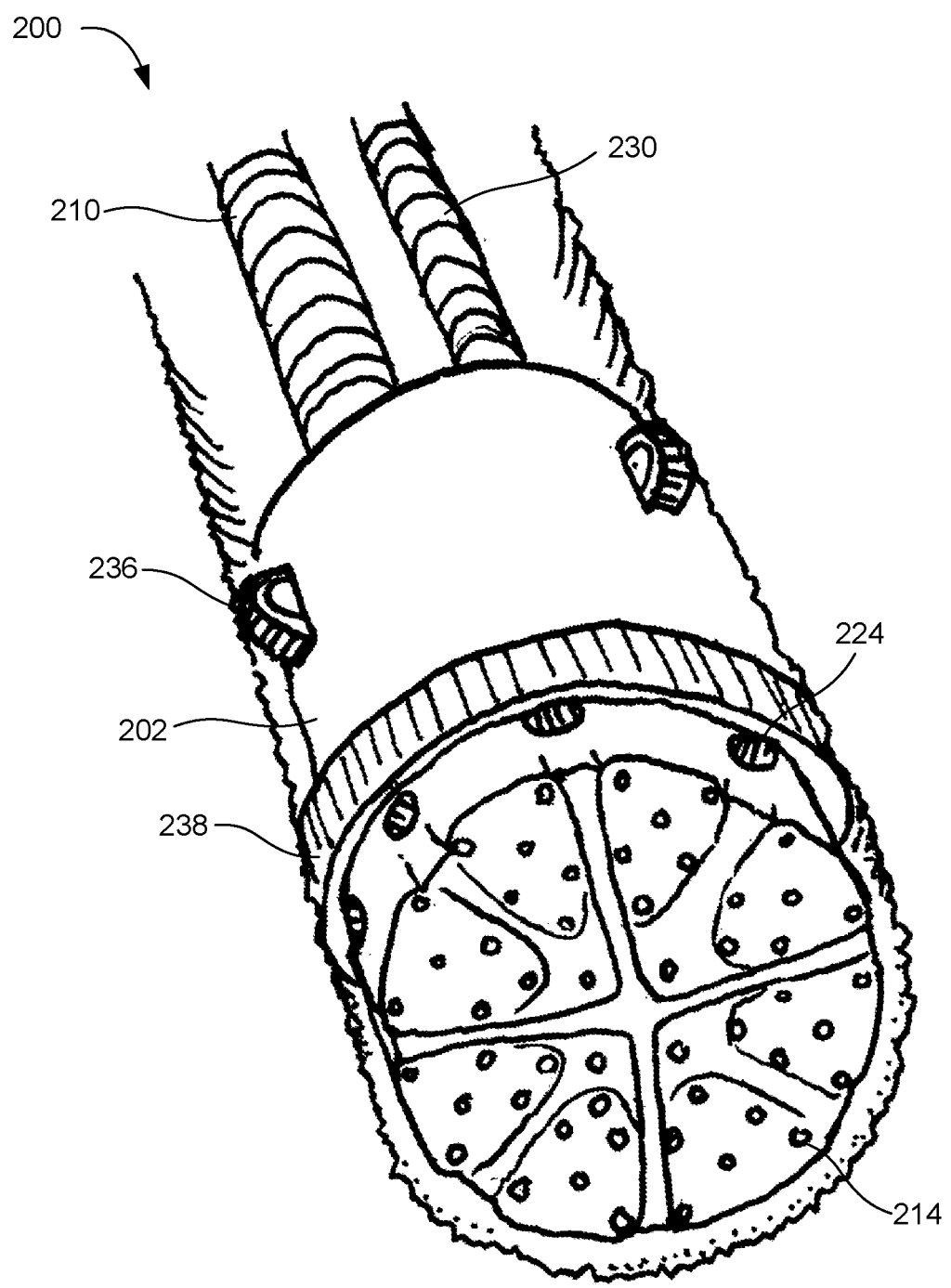
FIG. 5 is another perspective view of an example spallation drill head in accordance with an embodiment of the present invention.

FIG. 5 shows a perspective front view of the spallation drill head 200. The primary face of the spallation drill head is shown with a plurality of liquid jets 214 appearing as holes in the primary face of the drill head body. This array of liquid jets can all be fed by the cold liquid supply line 210 through an internal cold liquid connection as described above. The individual liquid jets can be oriented facing in different directions due to the curvature of the primary face of the drill head body.

FIG. 5 also shows an array of slurry extraction openings 224 on the lateral face of the drill head body 202 positioned slightly rearward from the primary face. When fragments of rock are spalled by the liquid jets, the slurry of liquid and rock fragments can be pumped out of the borehole through these slurry extraction openings. The slurry can be pumped up a slurry line 230, which is shown leading up the borehole next to the cold liquid supply line 210 in this figure. The inflatable packer 238 is also shown just rearward of the slurry extraction openings. The packer can inflate to seal of the volume of the borehole where the liquid is jetted onto the rock and from which the slurry is extracted. This figure also shows wheels 236 on the lateral surface of the drill head body. The wheels extend outward to the interior wall of the borehole so that the wheels can propel the drill head in the borehole as described above.

In certain examples, the primary face of the drill head body can also include features to mechanically damage the rock in the borehole. After the rock is fractured by thermal spallation, in some cases it can be useful to use a mechanical feature on the drill head body to scrape the fractured rock to fully remove rock fragments in the fractured zone. In some examples, the features for mechanical damage can include protrusions located in the cross-shaped area between the subsets of liquid jets shown in FIG. 5. The protrusions can include metal, diamond, carbide, or ceramic plates for scraping, pointed spikes, or other features in some examples. The primary face of the drilling head can also be designed to spin by including a "rotary union." In certain examples, the liquid jets on the primary face can be angled relative to the face to provide torque that drives the spinning motion of the primary face. In further examples, rotary drills, impact drills, or other mechanical drills can be placed on the primary face. Alternatively, or in addition to protrusions, the primary face of the drill head body can include grooves to guide fluid flow towards a periphery of the primary face and towards drainage pathways for the fluid and slurry.

Figure 6:
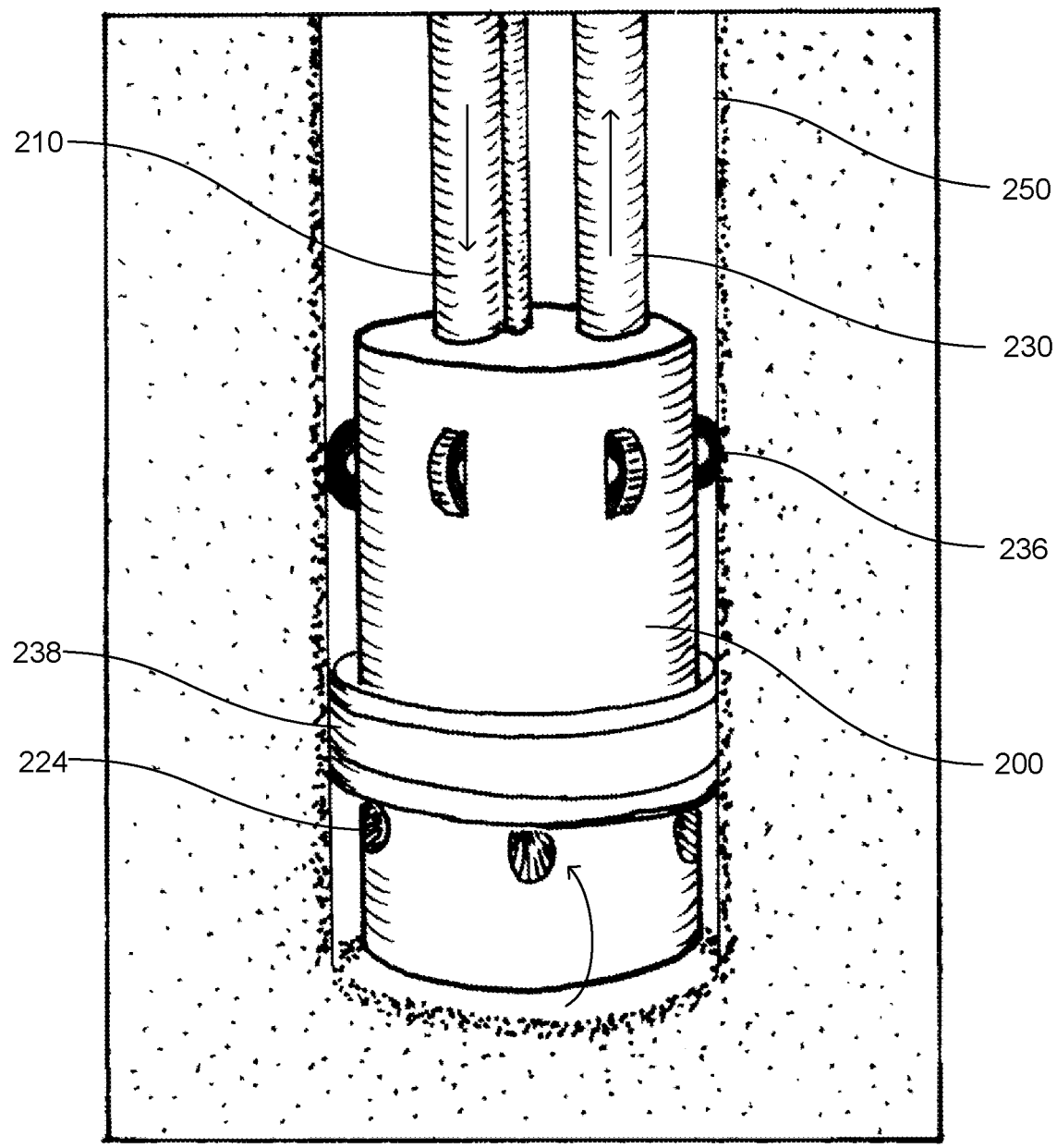
FIG. 6 is another perspective view of another example spallation drill head in accordance with an embodiment of the present invention.

Another similar example is shown in FIG. 6. This figure shows a side view of a spallation drill head 200 positioned in a borehole 250. The drill head is connected to a cold liquid supply line 210 and a slurry line 230. This example also includes wheels 236 on the sides of the drill head. Inflatable packers 238 are also on the sides of the drill head to seal the space between the drill head and the borehole walls. As rock slurry is formed by the drill head, the slurry flows through slurry extraction openings 224 on the sides of the drill head.

Figure 7:
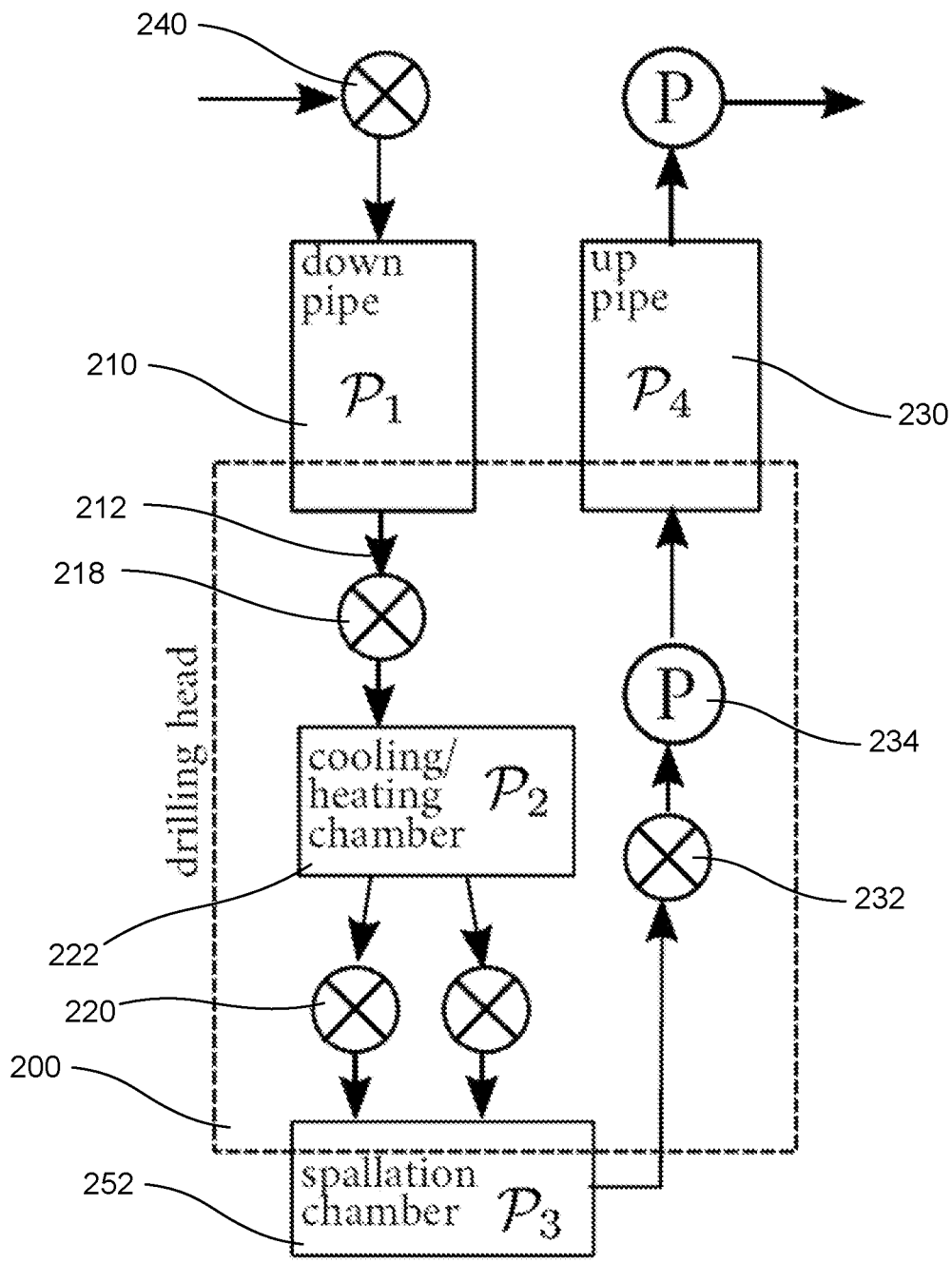
FIG. 7 is yet another schematic illustration of an example spallation drill head in accordance with an embodiment of the present invention.

A schematic diagram representing an example spallation drill head 100 fluid control system is shown in FIG. 7. In this figure, four separate volumes of fluid are represented as "reservoirs" with individual pressures $P_1$, $P_2$, $P_3$, and $P_4$. The respective volumes of fluid are (1) the fluid in the cold liquid supply line 210, labelled "down pipe," (2) the cold fluid in the internal cold fluid connection 212 where the chiller 222 is located, labelled "cooling chamber," (3) the fluid that has been jetted from the liquid jets and is occupying the volume outside the drill head body plus the volume inside the slurry extraction openings, labelled "spallation chamber," 252 and (4) the slurry in the slurry line 230 that is being pumped up to the surface, labelled "up pipe." These four bodies of fluid can also have individual temperatures. In some examples, the pressures of these volumes of fluid can decrease from $P_1$ to $P_4$. This figure also shows a cold liquid valve 240 at the surface and another valve 218 in the drill head that controls the flow of cold liquid into the cooling chamber. Two valves 220 control the flow of liquid to two subsets of the liquid jets. A slurry valve 232 is positioned below a slurry pump 234. The slurry pump can pump the slurry up the slurry line, and another slurry pump is located at the surface to provide additional pumping of the slurry.

The valves and pumps can all be considered to be parts of a mass flow controller. In some examples, the mass flow controller can control the pressures of the various volumes of fluid shown in FIG. 7. The mass flow controller can also include sensors or can be in communication with sensors. The sensors can monitor various characteristics of the drill head, borehole, and surrounding formation. In some examples, the sensors can include temperature sensors, fluid pressure sensors, acoustic sensors, proximity sensors, and others. Thus, a combination of data from acoustic and thermal sensors can be used to determine if and when spallation has fallen below a desired threshold rate such that a pause is desired to allow exposed rock to reheat. Fluid pressure sensors can feed data to a control system for the mass flow controllers, to maintain or vary the fluid in the different chambers, to control the cracking and spallation rates. In situ testing/experimentation can be performed to learn the cracking rates as functions of temperature differential and pressure/mass flux, as rock type and properties and thermodynamic conditions change with progressive movement of the apparatus.

In some examples, the mass flow controller can cause the valves and pumps to operate in a particular sequence. In one example, the mass flow controller can open the valves that control the liquid jets so that liquid is jetted onto the rock. At the same time, the mass flow controller can close the valve on the slurry line so that the pressure is contained in the volume outside the fluid jets, and so that the slurry pump is protected from the high pressure. This can be referred to as pulse of the liquid jets. After a period of time, the valves controlling the liquid jets can be closed to stop the flow of liquid from the liquid jets. The slurry valve can then be opened and the slurry pump can be activated to pump the slurry of liquid and rock fragments out of the volume beneath the primary face of the drill head. In an alternative example, the slurry pump can be running constantly as liquid is jetted from the liquid jets. This can provide a continuous jet of liquid onto the rock and then the liquid can continuously be pumped out through the slurry line. Accordingly, depending on the particular application, the pumps and valves can be operated in a "start and stop" mode or a continuous mode.

Additionally, the motion of the spallation drill head itself can start and stop in some examples, while in other examples the motion can be continuous. In one example, the spallation drill head can advance to a position in the borehole and stop. The inflatable packer can be inflated and the spallation drill head can be held stationary while the liquid jets are used to fracture and remove rock from the bottom of the borehole. Then, after a desired amount of rock has been removed, the inflatable packer can be deflated or otherwise retracted and the spallation drill head can advance further in the borehole. In alternative examples, the spallation drill head can move continuously as the borehole is extended. In certain examples, the inflatable packers can be configured to slide along the walls of the borehole while still maintaining a sufficient seal, or at least a partial seal, against the walls.

In certain examples, the drill head can include an extendable forward portion that can move forward down the borehole while the body of the drill head remains locked in place. The extendable portion can include the primary face of the drill head and the liquid jets. In some example, this extendable portion can slide telescopically or detach from the remainder of the drill head body and move independently. This can allow the drill head body to remain locked in place while drilling can continue for a distance down below the drill head body, as far as the extendable portion can extend. It can be useful to maintain the primary face of the drill head at substantially constant distance from the layer of rock being fractured. Therefore, the extendable portion can move downward in the borehole at the same rate as rock is being removed by spallation. In examples that include inflatable packers, it can be useful to reduce the frequency at which the inflatable packers are inflated and deflated because this can reduce wear and tear on the inflatable packers. Keeping the inflatable packers in one place while extending the extendable portion of the drill head can allow many layers of rock to be removed before the inflatable packers are deflated and the entire drilling head body is moved downward in the borehole. This can extend the functional life of the packers (or other sealing elements) and speed up the drilling process. In further examples, the extendable portion can be extended downward until it physically contacts the rock below the drill head. The extendable portion can include mechanical damage features such as protrusions from the primary face that can mechanically damage the rock. The extendable portion can be designed to rotate so that the mechanical damage features scrape rock fragments from the rock through rotation. Alternatively, the extendable portion can strike the rock similar to a hammer to mechanically damage the rock. The mechanical damage can augment the fragmentation of the rock through thermal spallation.

Figure 8A:
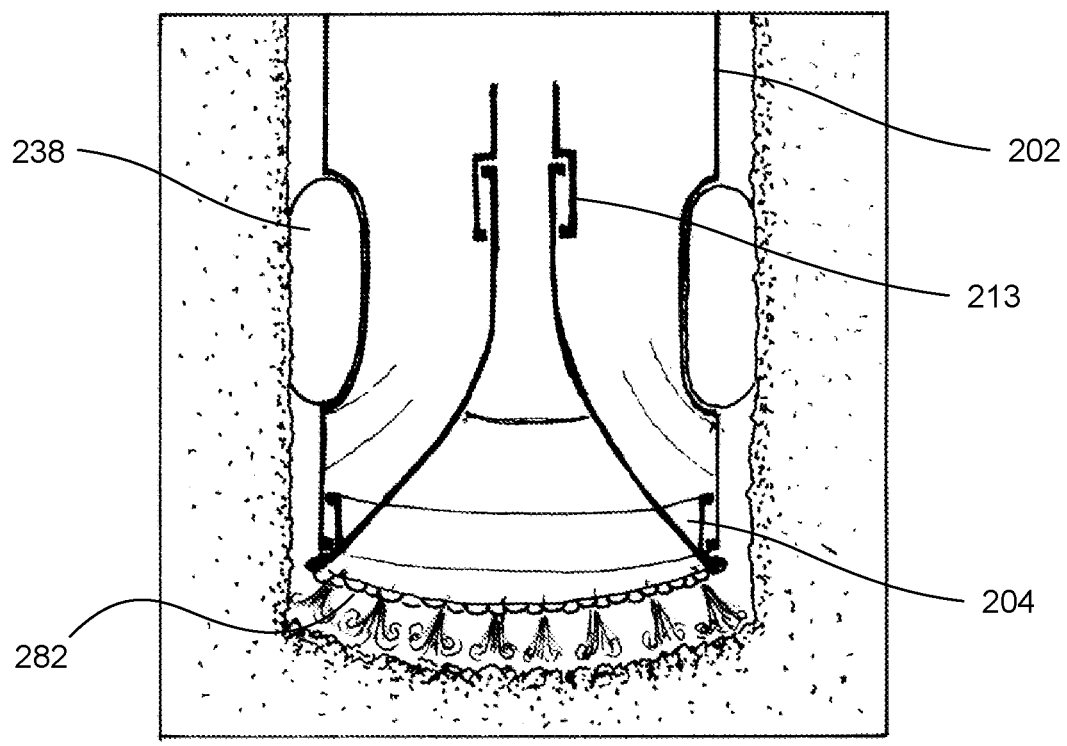
FIGS. 8A and 8B are schematic illustrations of a spallation drill head having an extendable portion.
Figure 8B:
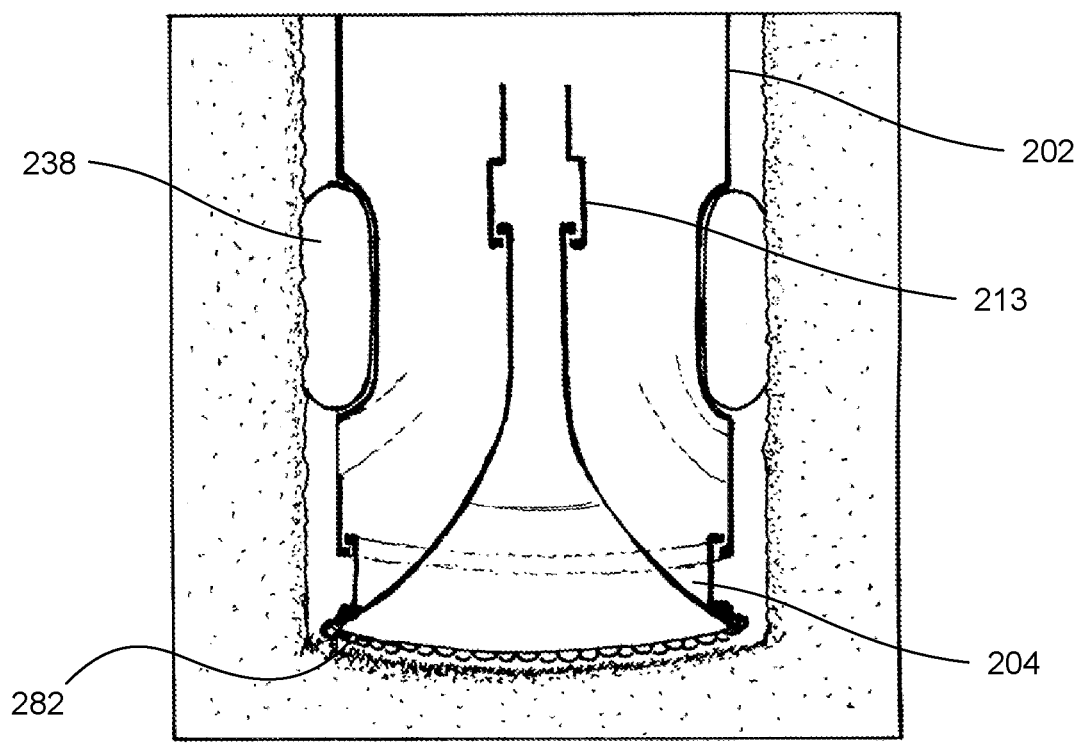

FIG. 8A shows a portion of an example spallation drill head that includes a drill head body 202 with an extendable portion 204. The extendable portion is at the forward end of the drill head and includes the primary drilling face. This example also includes a sliding connection 213 on the internal liquid connection that feeds liquid to the liquid jets. The extendable portion is shown in a retracted position in FIG. 8A. FIG. 8B shows the extendable portion in its extended position. Extending the drill head in this way allows the primary face of the drill head to move downward as layers of rock are removed beneath the drill head, while the remainder of the drill head body can remain stationary. As shown in the figures, the inflatable packer 238 is inflated.

Keeping the drill head stationary for a longer time can allow the drill head to operate longer before deflating and re-inflating the inflatable packer. This example also includes mechanical damage features 282 on the primary drilling face. In this particular example, the mechanical damage features are bumps on the primary drilling face that can help fracture and remove rock fragments. The extendable portion can be designed to rotate and provide force to achieve mechanical scraping and grinding, by rotating while the mechanical damage features are in contact with the rock. The extendable portion may alternatively be designed to strike the rock with a hammering motion to mechanically damage the rock.

Figure 9A:
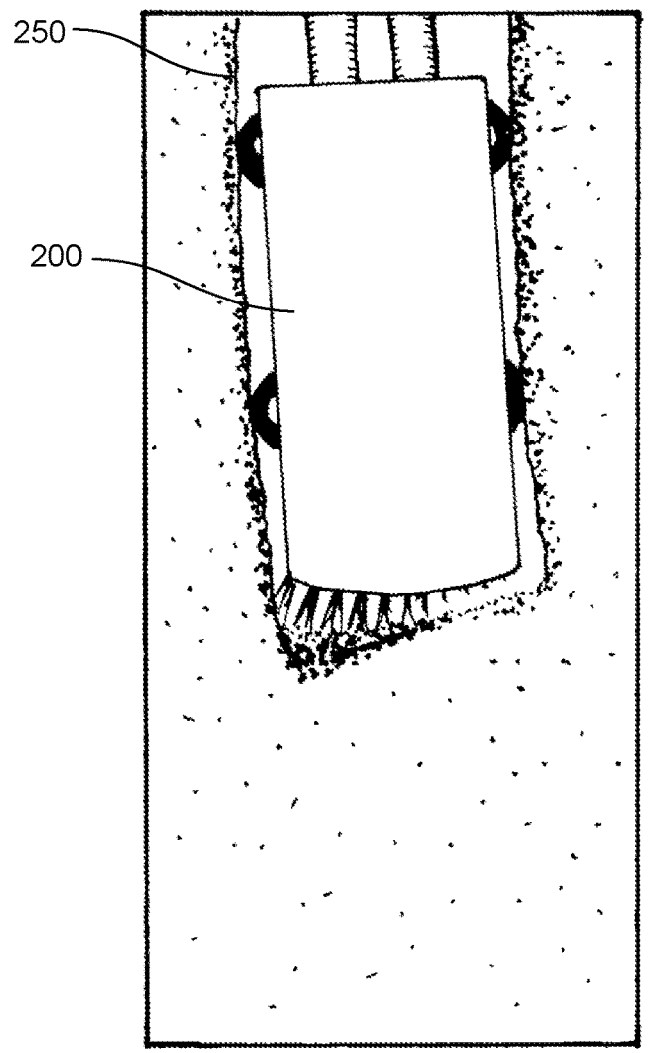
FIG. 9A is a side cross-sectional view of an example curved borehole with a spallation drill head in the borehole, in accordance with an embodiment of the present invention.
Figure 9B:
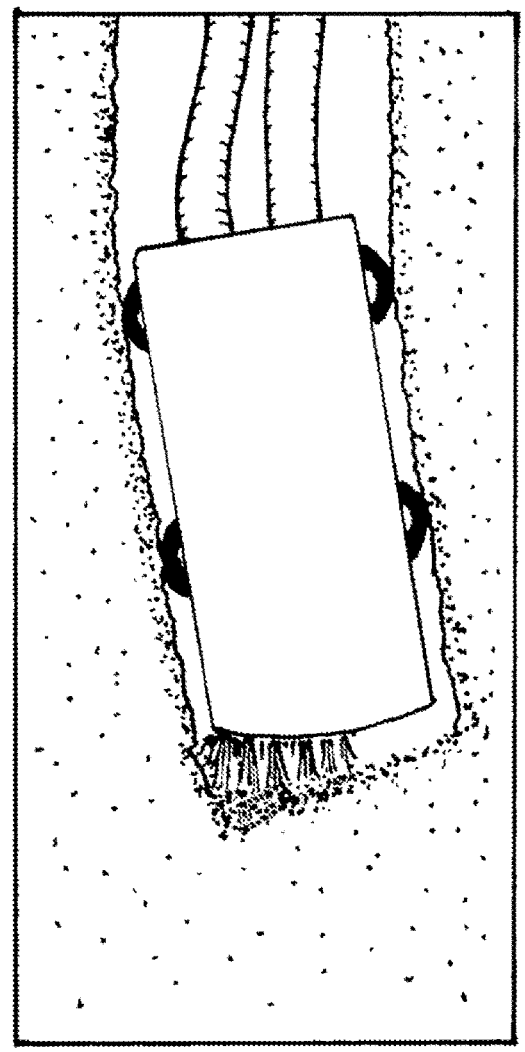
FIG. 9B is another side cross-sectional view of an example curved borehole with a spallation drill head in the borehole, in accordance with an embodiment of the present invention.

FIG. 9A shows an example spallation drill head 200 that is being steered to form a curved borehole 250. In some examples, the liquid jets can be controlled so that more liquid is jetted on one side of the borehole and less liquid is jetted on the opposite side of the borehole. This can cause more rock fracturing on one side than the other. When many layers of rock are fractured and removed in this way, the borehole can tend to curve to the side. FIG. 9B shows a close up view of the spallation drill head after the drill head has moved downward. A greater amount of rock has been removed on the left side of the borehole in this example, which causes the borehole to curve to the right. In some cases, in order to curve the borehole, a greater amount of liquid can be jetted on the side of the borehole that is opposite from the desired direction of curvature. For example, if the borehole is to be curved toward the left side then a greater amount of liquid can be jetted on the right side of the borehole. In other cases, a greater amount of liquid can be jetted on the same side as the desired direction of curvature. The drill head can be steered in some examples by using some of the liquid jets but not others, or by jetting more water through some of the jets than others. The liquid jets can be individually controllable in some examples, so that each individual jet can be adjusted to jet more or less liquid. In other examples, the jets can be grouped into subsets or zones of jets. Each subset of jets can be independently controllable. In certain examples, the liquid jets can be divided into two subsets, four subsets, eight subsets, or any other number of subsets that is convenient. The individual subsets can be controllable by the mass flow controller, for example by including individual valves that can adjust the flow of liquid to each subset of liquid jets. Because the fluid dynamics in the volume of space ahead of the spallation drill bit can be very complex, in some cases the effects of adjusting various liquid jets may be difficult to predict. Accordingly, in some examples, experimental testing can be used to determine the appropriate control regime of the liquid jets that will result in curving the borehole in a desired direction. The spallation drill head can turn gradually when the borehole is curving. In some examples, the spallation drill head can form curved boreholes with a radius of curvature from about 100 meters to about 500 meters.

Figure 10A:
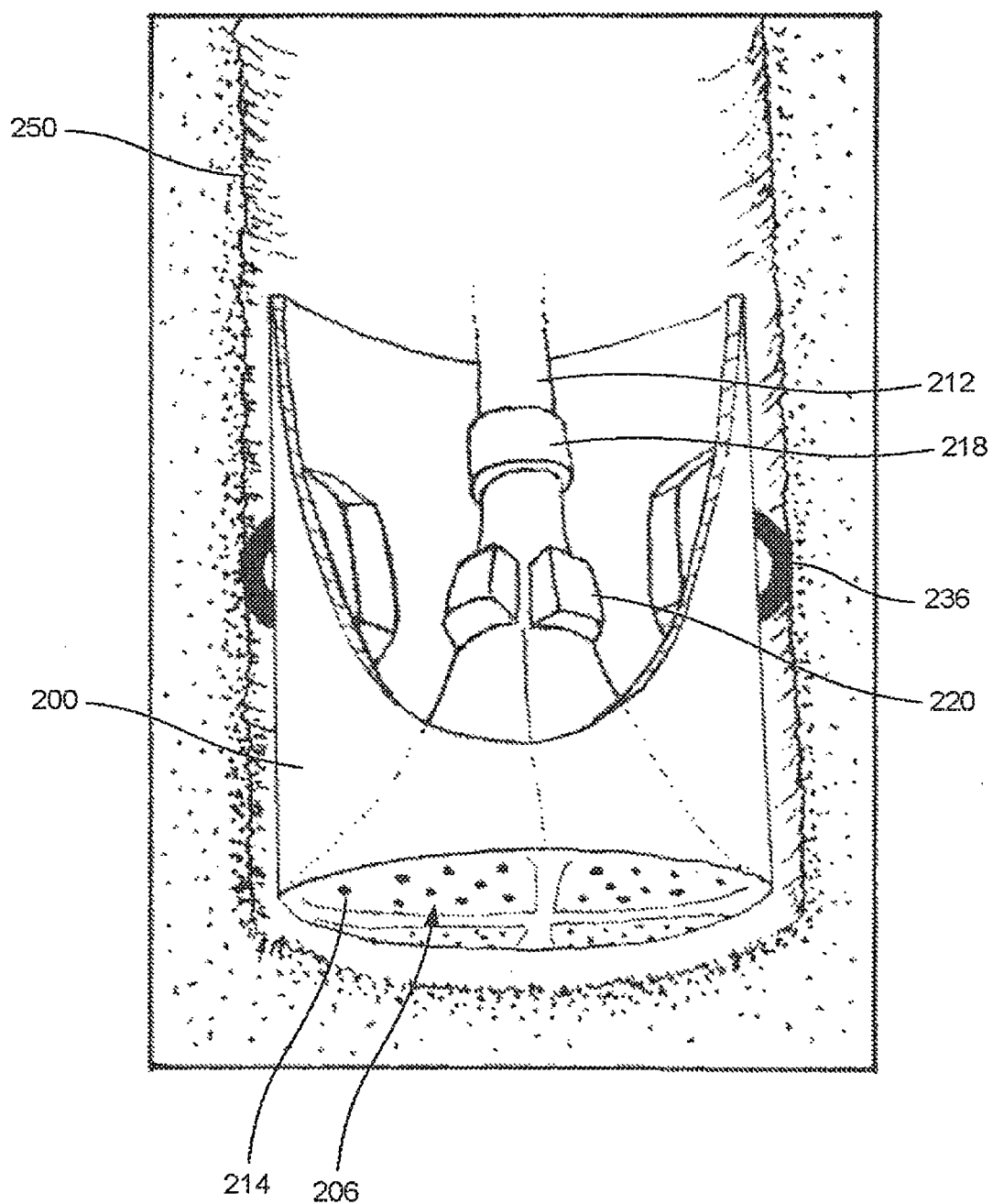
FIG. 10A is a cut-away view of an example spallation drill head, in accordance with an embodiment of the present invention.

FIG. 10A is a cutaway view of an example spallation drill head 200 that includes multiple groups 206 of liquid jets 214. In this example, the liquid jets are divided into four groups, which are arranged in four quadrants of the primary face of the drill head. The flow of liquid through each group of liquid jets is controlled by an individual control valve 220 within the drill head. A main valve 218 is also connected to a cold liquid connection 212 and to all of the liquid jets to adjust the overall flow rate to all of the liquid jets. The main valve and/or the individual control valves can be used to pulse liquid flow through the liquid jets. The individual control valves can be used to steer the drill head by fracturing more rock on one side or another of the borehole 250. As in the previous example, the drill head includes wheels 236 that can be used to propel the drill head, to aid in steering, to center the drill head in the borehole, and/or to lock the drill head in place in the borehole.

Figure 10B:
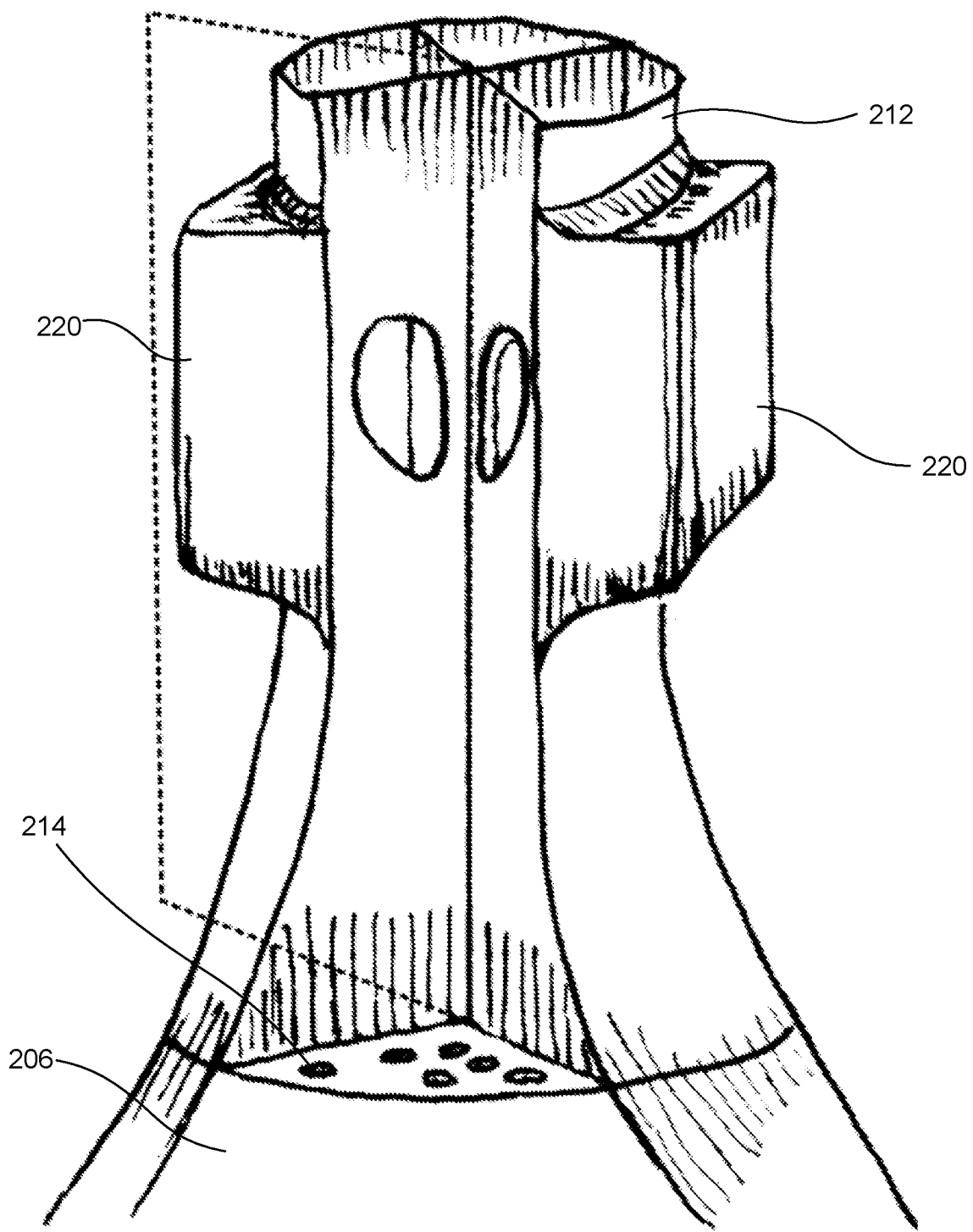
FIG. 10B is a close up cut-away view of a steering mechanism in the example of FIG. 10A.

FIG. 10B shows a closer cutaway view of the steering mechanism used in the example of FIG. 10A. Control valves 220 are arranged around the cold liquid connection 212. Each control valve can control the flow or shut off the flow through one quadrant of the mechanism. The quadrants lead to the four groups 206 of liquid jets 214. FIGS. 10C and 10D show cross-sectional views of a control valve in an open and closed position. In the open position shown in FIG. 10C, the valve includes a wedge 270 and a screw actuator 272 that can be driven hydraulically or electrically. The wedge is hinged to allow the wedge to swing out of the flow pathway or into the flow pathway. When the valve is open, the force of liquid flowing downward through the valve keeps the wedge in this position, out of the flow pathway. The screw actuator can include a threaded screw that can rotate and move up or down due to the rotation motion of the threads. In the closed position shown in FIG. 10D, the screw actuator rises to push on the wedge and cause the wedge to move into the flow pathway. The wedge can move all the way into the flow pathway to fully close the valve. The walls or barriers defining the quadrants of the pipe can have openings above the valve locations such that when a valve closes, the fluid from the closed quadrant can be directed into an open quadrant. FIG. 10E shows a cross-sectional view of the control valves, looking from upstream of the control valves, in the direction of fluid flow. In the first example, the four control valves are all fully open. In the second example, two of the valves are open and two are closed, in order to steer the drilling head to the west (in a vertical borehole with north towards the top of the page). In the third example, a different set of two valves are open and the other two are closed, to steer towards the north. In some examples, the drill head can steer in the opposite direction of the two open valves. This is because the open valves allow liquid to flow out through the liquid jets, causing more rock fragmentation on the side of the drill head with the open valves.

Figures 11A, 11B:
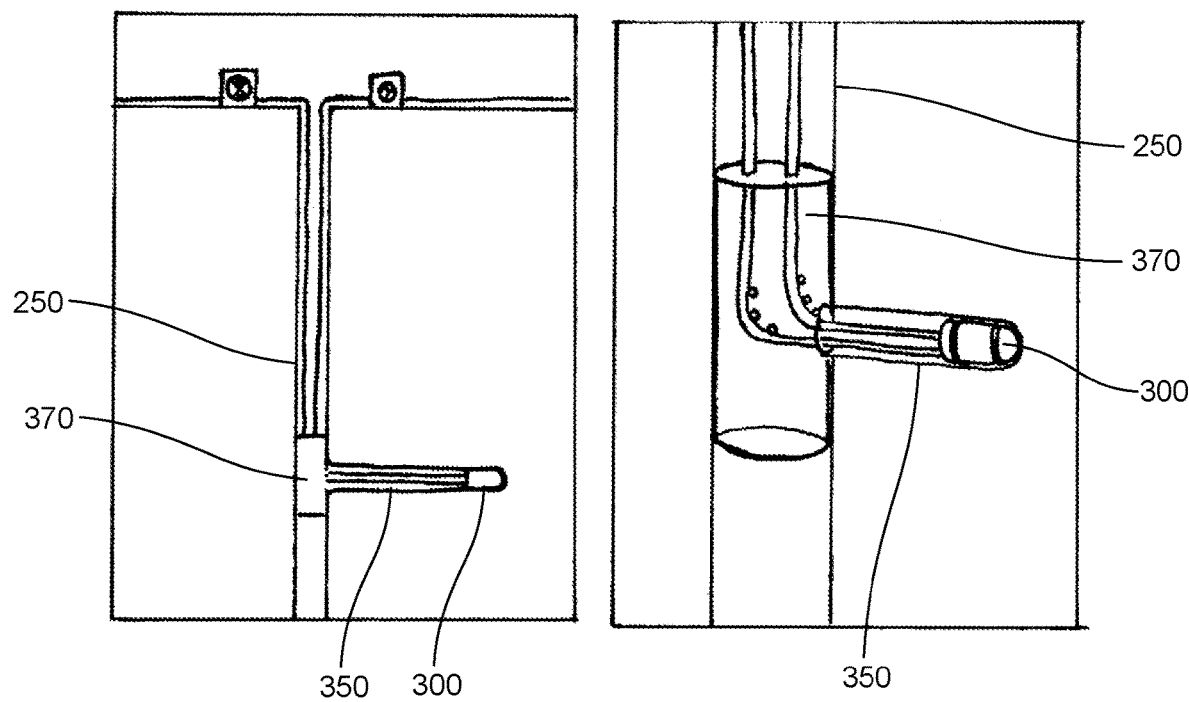
FIG. 11A is a side cross-sectional view of an example primary borehole with a secondary borehole and a spallation drill in the secondary borehole, in accordance with an embodiment of the present invention.
FIG. 11B is a close up of the secondary borehole with the spallation drill head inside the secondary borehole, in accordance with an embodiment of the present invention.
Figure 11C:
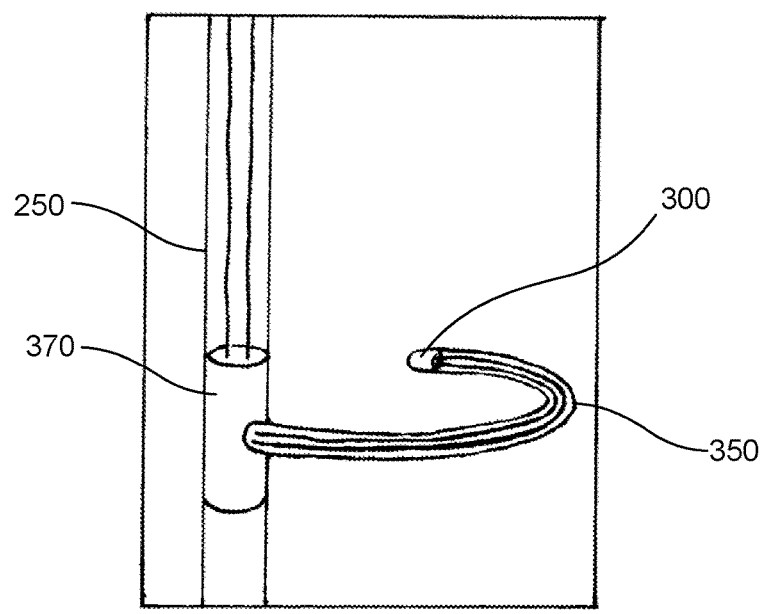
FIG. 11C is a close up of the spallation drill head forming a loop-shaped secondary borehole, in accordance with an embodiment of the present invention.
Figure 11D:
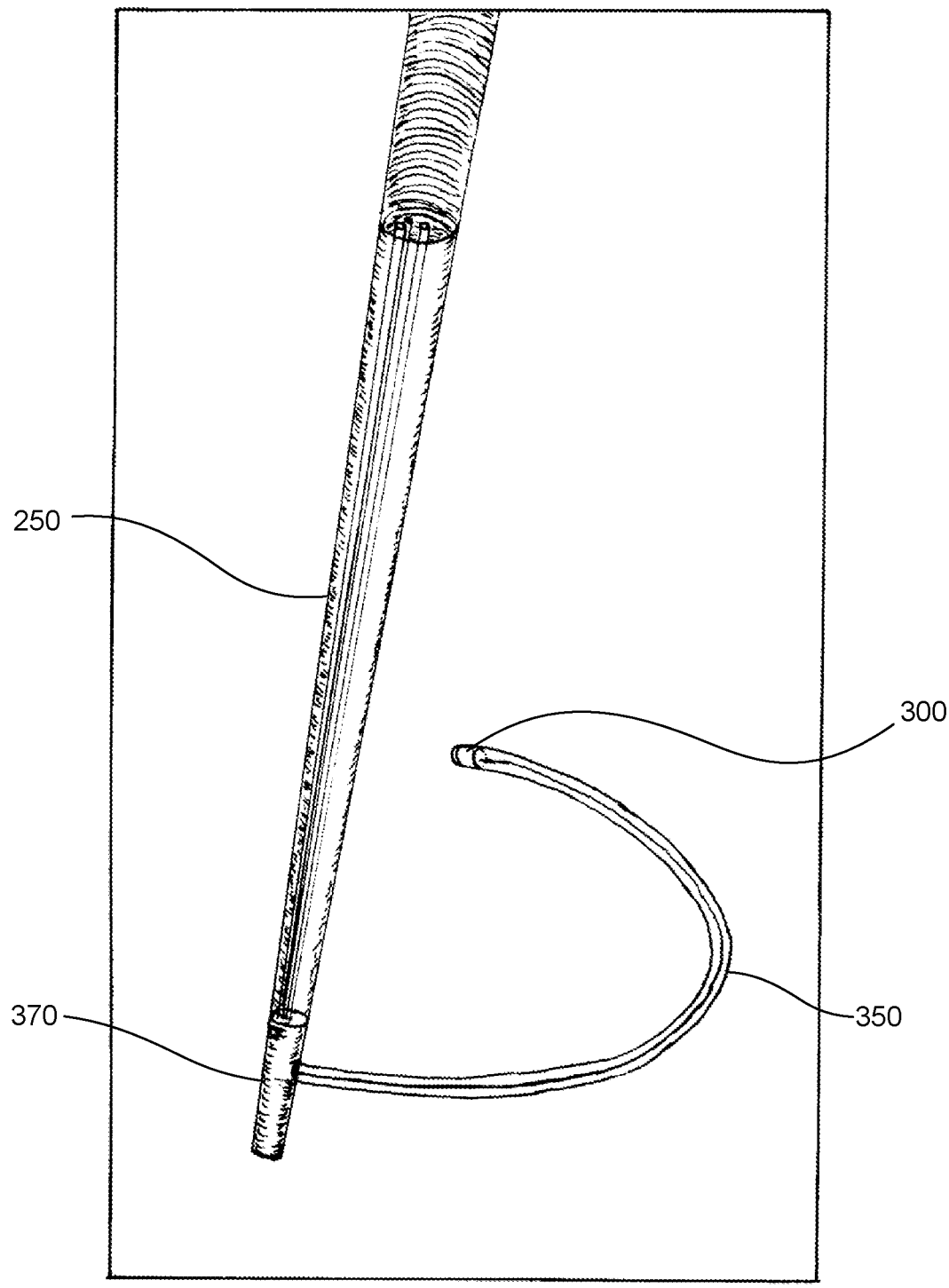
FIG. 11D is a perspective view of the primary borehole and the secondary borehole.

FIGS. 11A and 11B show an example of a spallation drill head 300 that is drilling a secondary lateral borehole 350 oblique to a central borehole 250. In this example, a base unit 370 is placed in a primary borehole. The base unit launches a smaller spallation drill head from the side to drill a lateral secondary borehole. This secondary borehole is approximately perpendicular to the primary borehole. Drilling lateral secondary boreholes in this way can be useful in a variety of situations, such as for drilling a network of lateral boreholes to use for heat transfer when producing energy from a geothermal formation. In this case, the base unit does not include a drilling head or drill mechanism other than the deployable lateral drill head FIG. 11C shows a further example, in which the spallation drill head is steered to form a loop-shaped secondary borehole. The loop-shaped secondary borehole can be completed by steering the spallation drill head back to the primary borehole, forming the secondary borehole as a complete loop. The loop-shaped secondary borehole can then be used to pump a heat transfer fluid through the loop for heat transfer for producing geothermal energy, in one example. FIG. 11D shows a perspective view of the primary borehole and the secondary borehole curving away from the primary borehole at a point in time when the secondary borehole has formed a partial loop back to the primary borehole. In some examples, the base unit that launches the secondary spallation drill head can be a geothermal heat mining device as described in U.S. Pat. No. 11,029,062, which is hereby incorporated herein by reference. In other examples, the base unit can be a device that launches a lateral secondary spallation drill head and which routes the cold liquid supply line and the slurry line from the surface to the secondary spallation drill head.

Figure 12:
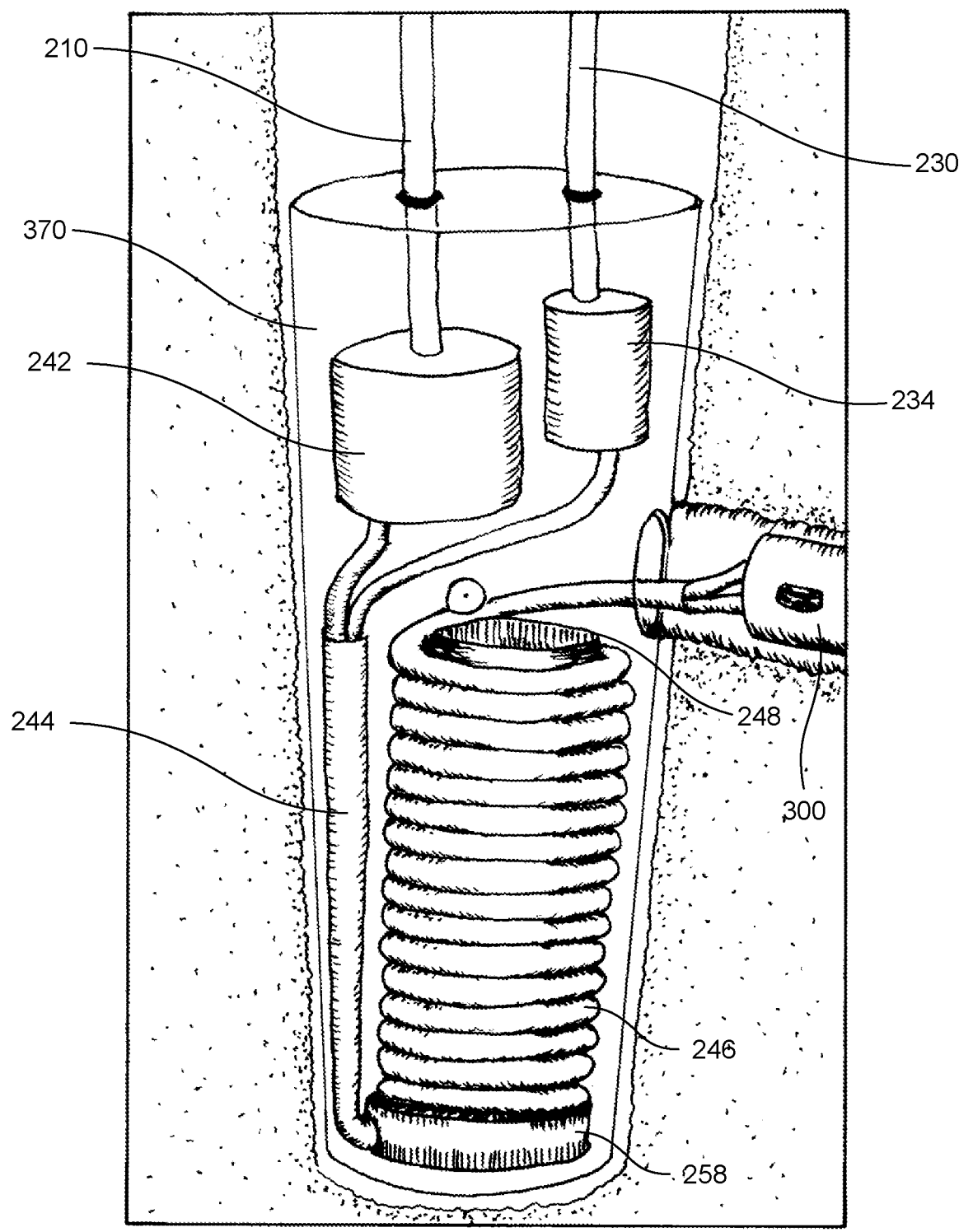
FIG. 12 is a schematic illustration of an example non-drilling base unit and secondary drill head, in accordance with an embodiment of the present invention.

FIG. 12 shows another example base unit 370 that can launch a secondary drill head 300. This base unit includes a liquid supply line 210 leading from the surface to the base unit. Liquid flows through the liquid supply line to a cold liquid pump 242 within the base unit. The cold liquid pump can pressurize the liquid to a higher pressure before the liquid flows to the secondary drill head. The base unit also includes a slurry pump 234 to pump slurry through a slurry line 230 back to the surface. Below the cold liquid pump and the slurry pump, the liquid supply line and the slurry line can both be enclosed in a hose 244. The hose can be wrapped in a coil 246 within the base unit. The other end of the hose can be at or near the secondary drill head. Thus, as the secondary drill head drills farther and farther away from the primary bore hole, the hose can uncoil and extend out from the base unit to keep the drill head connected to the liquid supply line and the slurry line. The coil of hose can be wrapped around a rotating drum 248, with a rotary union at its base 258.

Figure 13A:
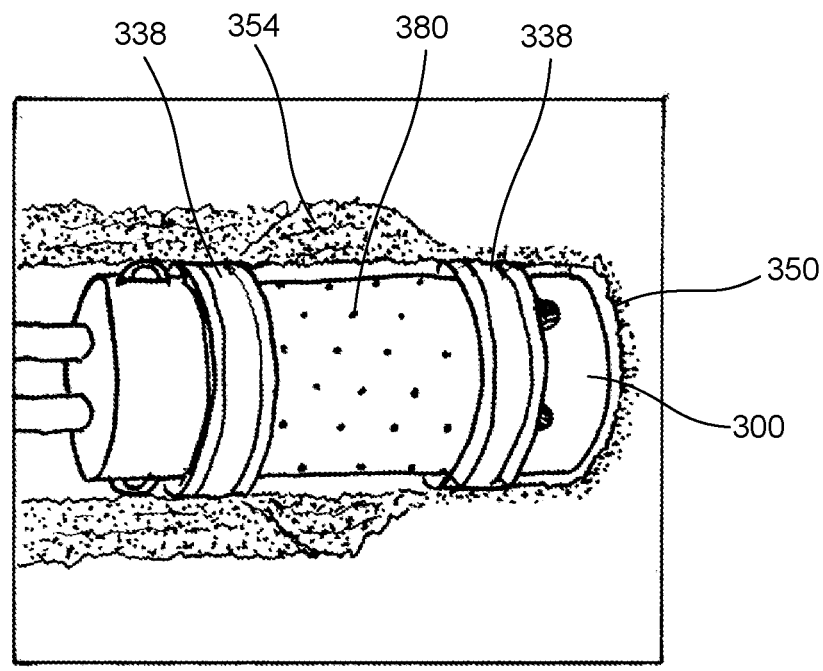
FIG. 13A is a close up of an example spallation drill head forming damage in walls of a horizontal borehole in accordance with an embodiment of the present invention.

FIG. 13A shows an example of a spallation drill head 300 forming a horizontal borehole 350. This example also includes additional liquid jets 380 on the lateral surfaces of the drill head body. These liquid jets are used to form networks of microcracks 354 in the walls of the horizontal borehole, or a vertical borehole, depending on the direction of drilling. The spallation drill head illustrated also includes two inflatable packers 338. One inflatable packer is near the forward end of the drill head body and the other inflatable packer is near the rear end of the drill head body. The lateral liquid jets are located on the lateral surface of the drill head body between the two inflatable packers. When both inflatable packers are inflated, this can isolate the volume between the lateral surface of the drill head body and the wall of the borehole. This can allow the lateral liquid jets to form an increased amount of microcrack damage in the walls of the borehole. In some examples, it can be useful to damage the walls of the borehole in this way in order to increase heat transfer from the rock, such as when the borehole is to be used for producing geothermal energy. Maintaining pressure or adding proppants to the jetted liquid can also help to reduce or eliminate self-healing of microfractures which might occur as temperatures rise.

Figure 13B:
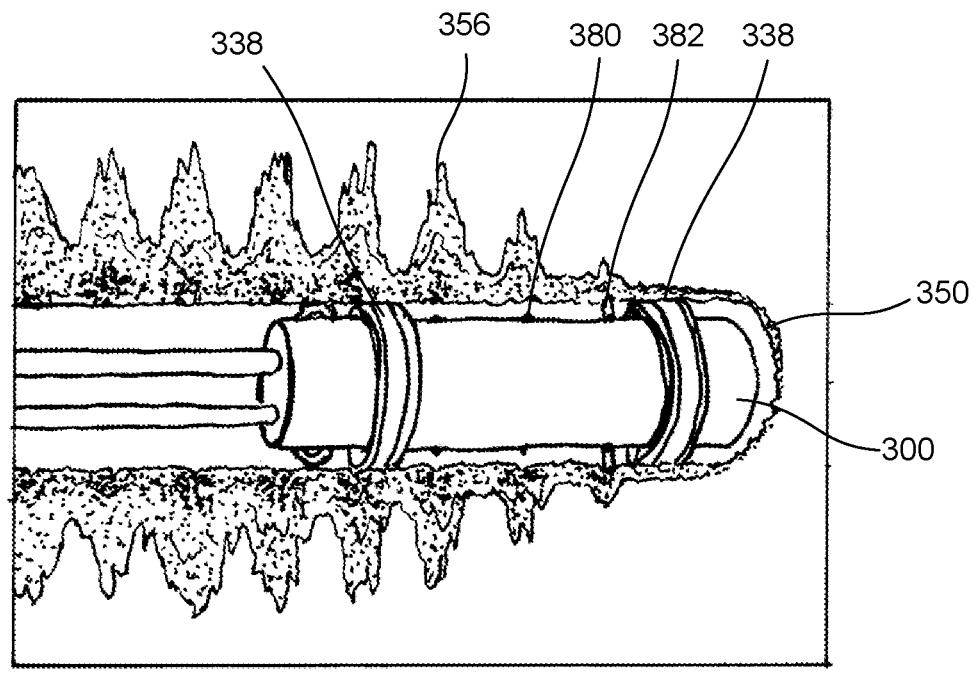
FIG. 13B is a close up of another example spallation drill head forming damage in walls of a horizontal borehole in accordance with an embodiment of the present invention.

FIG. 13B shows another example of a spallation drill head 300 forming a horizontal borehole 350. This example also includes liquid jets 380 on the lateral surface of the drill head body for damaging the walls of the borehole. However, this example has the liquid jets located in specific locations to form localized damage zones 356 that penetrate deeper into the rock. This is different from the example of FIG. 13A, which includes liquid jets spaced entirely across the lateral surface of the drill head body to form delocalized damage over the entire surface of the borehole walls. The example in FIG. 13B can form localized damage zones that penetrate deeper into the rock of the borehole wall. The spallation drill head in this example also includes lateral mechanical damage heads 382 near the forward end of the drill head body. These lateral mechanical damage heads can be small rotary drill heads or small impact drill heads. In one example, the spallation drill head in FIG. 13B can be positioned in a desired location in the borehole, and the inflatable packers 338 can be inflated to seal the volume between drill head body and the borehole wall, and also to hold the drill head stationary in one place. The lateral mechanical damage heads can then be used to form localized damage areas on the borehole wall. The inflatable packers can then be deflated and the spallation drill head can advance forward a small distance until the localized damage areas are aligned with a first set of lateral liquid jets on the lateral surface of the drill head body. The inflatable packers can be inflated again, and the first set of liquid jets can jet liquid onto the rock to form more microcracks in the rock. The microcracks can nucleate from the already damaged area so that a deeper network of microcracks forms in that location. At the same time, the lateral mechanical damage heads can be used to create another set of localized damage areas. The spallation drill head can then be moved forward again until the microcrack networks are aligned with a second set of lateral liquid jets. The second set of lateral liquid jets can jet liquid onto the rock to increase the depth of the microcrack network. Thus, deep damage zones can be formed in the borehole wall. Although the example shown in FIG. 13B has one set of mechanical damage heads and two sets of lateral liquid jets, any number of mechanical damage heads and lateral liquid jets can be used.

Methods of Cold Spallation Drilling

The present disclosure also describes methods of cold spallation drilling. In one example, a method of cold spallation drilling can include placing a cold spallation drill head in a borehole, wherein the cold spallation drill head comprises at least one liquid jet; jetting liquid in pulses from the at least one liquid jet onto rock of the borehole, wherein the liquid has a temperature below a temperature of the rock with a sufficient temperature difference that the jetting the liquid causes thermal contraction, forming fractures in the rock, thereby forming loose rock fragments through a combination of thermal fracturing and fluid pressure; and removing the liquid and loose rock fragments from the borehole as a slurry.

In some examples, placing the cold spallation drill head in a borehole can involve forming the borehole using the cold spallation drill head. In one example, the drill can be used as a hot spallation drill head for a time to form a borehole starting at the surface where the rock is at a relatively low temperature. Then the mode of operation can switch to cold spallation when the drill head reaches hotter rock below the surface. In another example, an initial borehole can be drilled from the surface with a mechanical drill head, such as a rotary drill head or impact drill head. The mechanical drill head can used until the borehole reaches a depth where the rock is at a higher temperature, such as greater than 100° C., greater than 200° C., greater than 300° C., greater than 400° C., or greater than 500° C. The rock may become more ductile as the temperature increases, which can reduce the effectiveness of the mechanical drill head. At this point, the mechanical drill head can be removed and the cold spallation drill head can be lowered down the borehole. The cold spallation drill head can then be used thereafter to drill through the hot rock.

The methods of cold spallation drilling described herein can also refer to using a cold spallation drill head to drill secondary or tertiary boreholes. The secondary or tertiary boreholes can branch off from other boreholes.

The liquid jets can be pulsed, meaning that the flow of liquid from the jets can be increased and decreased repeatedly over controlled durations. In some examples, the flow can be completely shut off for a time period between pulses, while in other examples the flow can continue but at a lower flow rate for a time between pulses. In some examples, the pulses can be oscillatory, such as following a sine wave pattern of pressure in time. The length of the pulses and the time between pulses can depend on a variety of factors, such as the temperature different between the liquid and the rock, the thermal expansion of the rock, practical factors such as tine for advancing the drill head forward between pulses, and others. The length of pulses can vary from on the order of 0.1 seconds to on the order of several days. Similarly, the length of time between pulses can vary from on the order of 0.1 seconds to on the order of several days.

In some examples, the spallation drill head can form damage zones in the walls of the borehole, such as shown in FIGS. 13A and 13B. If the borehole is to be used for geothermal energy extraction, then the damage zones can be useful for increasing heat transfer between the rock and a fluid that might flow through the borehole to extract heat. In some circumstances, microcracks in hot rock can heal themselves over time if the rock is at a sufficient temperature. Therefore, in some examples it can be useful to fill the borehole with a cooling fluid to prevent the microcracks from healing.

Any of the spallation drill heads described above and shown in the figures can be used to perform the methods described herein. Any other equipment described above can also be used in the methods. For example, a geothermal heat mining device can be used, and the geothermal heat mining device can include a spallation drill bit as a primary drill bit, or a secondary drill bit, or a tertiary drill bit, or a combination thereof. Additionally, in some examples a base unit can be lowered down a primary borehole and a spallation drill bit can be launched from the base unit to drill a lateral secondary borehole.

Figure 14A:
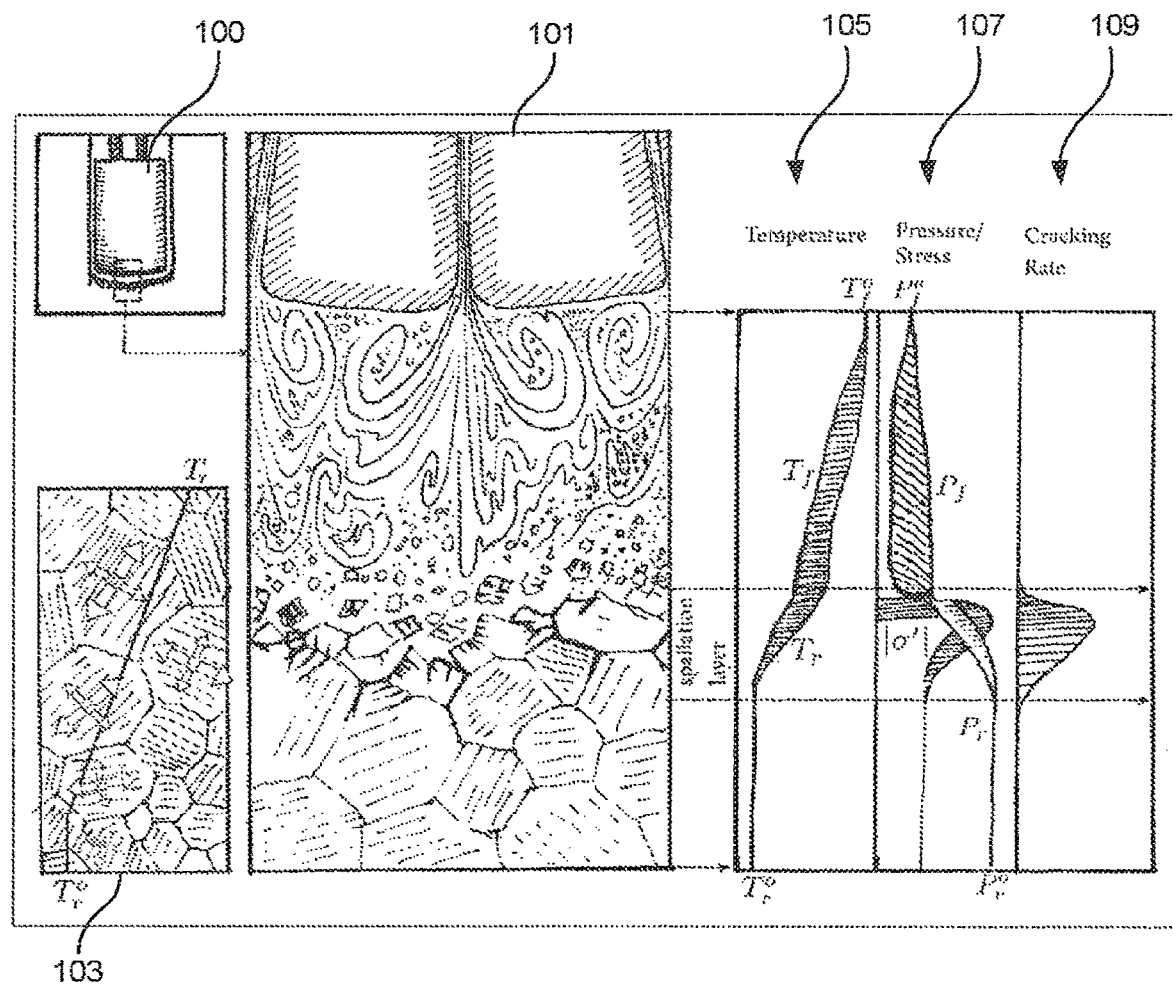
FIG. 14A is a close up of an example hot spallation drill head fracturing rock.

FIG. 14A shows a side view of an example of a spallation drill head 100 used for hot spallation drilling, with several additional views demonstrating the hot spallation process. A close up view of the spallation chamber 101 is shown, which corresponds to the dashed box shown enclosing a small area of the primary drilling face of the drill head and the rock that is being fractured. In this figure, a hot fluid is jetted from a fluid jet 114 onto rock in a borehole. The hot fluid heats the top layer of the rock and causes the rock to expand along a gradient in the direction normal to the fluid-rock interface. The expansion causes small fractures to form in the top layer of rock, and fragments of fractured rock are subsequently removed by the flowing fluid from the fluid jet. A close up view of the rock 103 is also shown. In this view, the thermal expansion of the rock is represented by arrows pointing outward in individual fragments of rock. The stress from the thermal expansion causes the rock to fracture and break in to smaller fragments. The thermal expansion increases as the temperature of the rock increases closer to the hot liquid jets, as indicated by the temperature gradient. The magnitude of the thermal stresses (and geometry of resulting cracks) depends on many factors including the anisotropy of thermal expansion (as indicated by the relative magnitude of the orthogonal arrows in each crystal, parallel and normal to lattice planes), the degree of misorientation of crystals relative to each other, the geometry and properties of the grain boundaries, and the boundary conditions on any volume of rock. FIG. 14A also shows a series of graph representations of properties, including temperature 105, pressure 107, and cracking rate 109. These properties vary with height throughout the layer of rock that is being fragmented and the liquid in the spallation chamber. The temperature of the liquid, $T_f$, is at an initial hot liquid temperature when the liquid is within the drill head before being jetted out. After the liquid is jetted out of the liquid jets, the liquid becomes turbulent and there are wide spatial variations in temperature in the liquid in this turbulent volume. The variation in temperature is represented by the widening line in the temperature graph. The temperature decreases at positions closer to the rock. The layer of rock being fractured also has some temperature variation, and the temperature in the rock, $T_r$, decreases in the downward direction until the cooler temperature of the bulk, unfractured rock, $T°_r$ is reached. The pressure graph shows that the pressure of the liquid, Pf, is less than the pressure of the rock, $P_r$, and local pressure variations in the turbulent liquid and in the spallation layer are represent as a widening line in the pressure graph. This graph also shows a curve labelled |σ'|, which represents the magnitude of the differential stress in the rock. This stress increases in the spallation layer as the rock heats up and expands, but then drops off to zero when the rock fragments break apart. The magnitude depends on the local temperature change, but also the temperature gradient. The cracking rate graph shows that the cracking rate increases from the bottom of the spallation layer to the top of the spallation layer and then quickly drops off to zero after the rock has cracked and the fragments have separated. These values vary in time and space, and in ideal steady spallation drilling, propagate together into the rock as a coherent front.

Figure 14B:
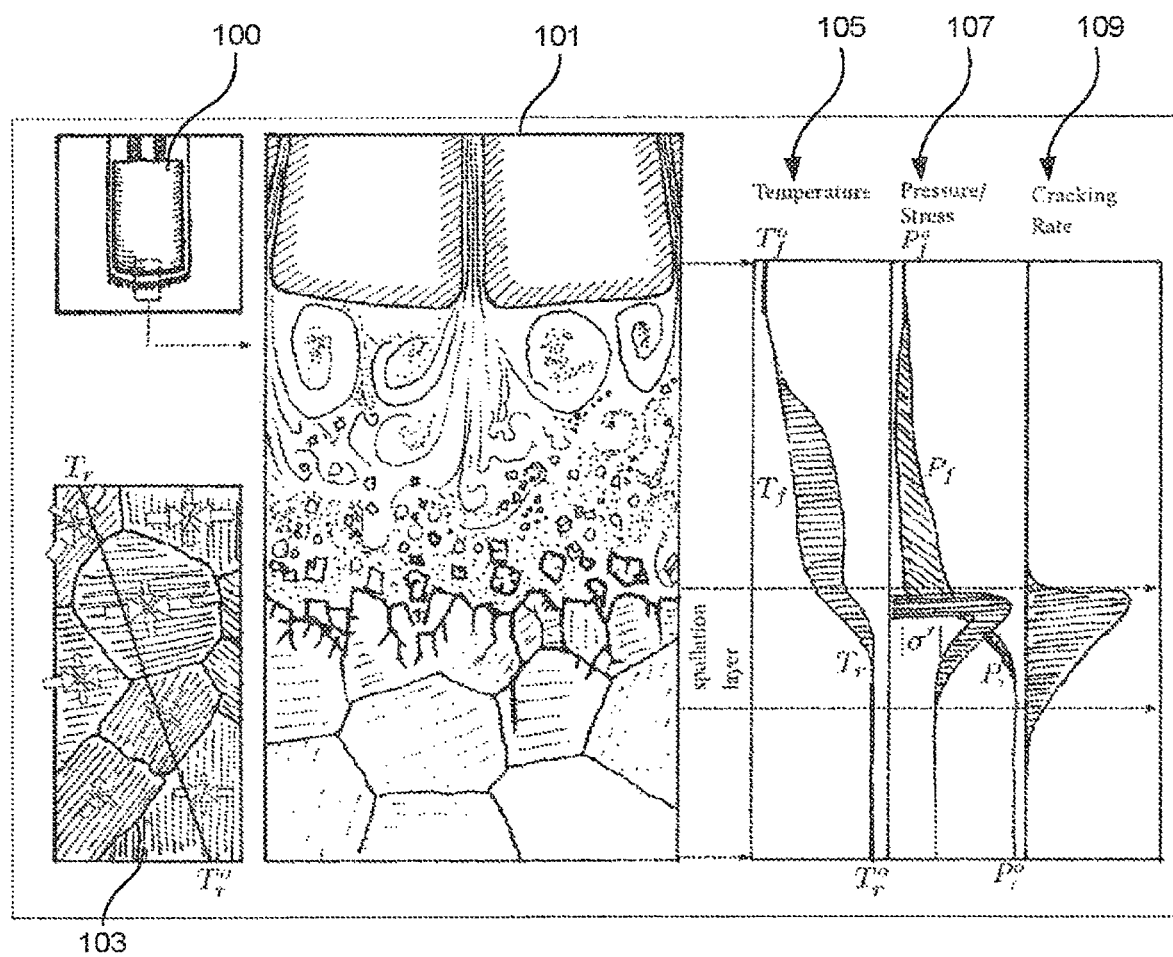
FIG. 14B is a close up of an example cold spallation drill head fracturing rock.

FIG. 14B shows another side view of an example of a spallation drill head 100 used for cold spallation drilling, with several additional views demonstrating the cold spallation process. A close up view of the spallation chamber 101 is shown, which corresponds to the dashed box shown enclosing a small area of the primary drilling face of the drill head and the rock that is being fractured. In this example, cold liquid is jetted onto hot rock in the borehole. A layer of rock cools down and thermal contraction causes the rock to crack and break into fragments. The close up view shows the rock breaking into small fragments that are then removed by turbulent liquid flow in the spallation chamber volume beneath the drill head. A close up view of the rock 103 is also shown. In this view, the thermal contraction of the rock is represented by arrows point inward in individual fragments of rock. This thermal contraction causes the rock to fracture into fragments. The contraction increases as the temperature of the rock decreases closer to the cold liquid jets. FIG. 14B also shows a series of graph representations of properties, including temperature 105, pressure 107, and cracking rate 109, with symbols defined above. These properties vary with height throughout the layer of rock that is being fragmented and the liquid in the spallation chamber. The temperature of the liquid is at an initial cold liquid temperature when the liquid is within the drill head before being jetted out. After the liquid is jetted out of the liquid jets, the liquid becomes turbulent and there are wide spatial variations in temperature in the liquid in this turbulent volume. The variation in temperature is represented by the widening line in the temperature graph. The temperature increases at positions closer to the rock. The layer of rock being fractured also has some temperature variation, and the temperature in the rock increases in the downward direction until the temperature of the bulk, unfractured rock is reached. The pressure graph shows that the pressure of the liquid is less than the pressure of the rock, and local pressure variations in the turbulent liquid and in the spallation layer are represent as a widening line in the pressure graph. This graph also shows a curve labelled |σ'|, which represents the magnitude of the differential stress in the rock. This magnitude increases in the spallation layer as the rock cools and contracts, but then drops off to zero when the rock fragments break apart after being cooled. The cracking rate graph shows that the cracking rate increases from the bottom of the spallation layer to the top of the spallation layer and then quickly drops off to zero after the rock has cracked and the fragments have separated.

The intent of the design of the embodiments with spallation chambers is to be able to control the fluid flow in and out of the spallation chamber such that the temperatures and pressures inside the chamber, and thus the temperature gradient and stresses in the spalling layer of the rock can be regulated as closely as possible, in order to maximize drilling rates while still being able to evacuate the slurry. Several conditions for modes of operation can be defined, and combined in a temporal sequence as needed to maintain an optimal thermal gradient and cracking rate: "Shut-in" describes a condition where both inlet and outlet valves are shut, such that liquid in the spallation chamber and the rock move towards thermal equilibrium. For cold spallation, the liquid temperature and pressure both rise. "Steady flow" maintains equal flow rates in and out and can lead to the coolest sustained temperatures on the surface. "Active Pressure Control" conditions lead to a decreased or increased fluid pressure in the spallation chamber; a fluid pressure decrease can help grow cracks by lowering the local normal stress, change liquid to vapor phases inside cracks and enhancing the pressure differential in the rock from lithostatic to the local pressure in the chamber, achievable by lowering the flow rate into and increasing the flow rate out of the chamber; a fluid pressure increase can drive cracks by increasing the hydraulic pressure inside those cracks driving them forward (i.e. small scale hydraulic fracturing), achievable by lowering the flow rate out and raising the flow rate into the chamber. These conditions and others not described are all enabled by the combination of packers, slurry evacuation channels, fluid jets and their respective mass flow controllers in this invention, in addition to the central element of the design, the control of the thermal disequilibrium between the rock and liquid.

Any of the example spallation drill heads and systems described herein that have been described specifically with respect to cold spallation drilling may also be used for hot spallation. To use the drill heads for hot spallation drilling, a hot fluid can be used instead of a cold fluid or cold liquid. Thus, the "cold liquid supply line" or "cold fluid supply line" can be replaced by a hot fluid supply line. Similarly, the "cold liquid connection" or "cold fluid connection" can be replaced by a hot fluid connection, and so on. In further examples, a heater can be included in the spallation drill head in place of a chiller. Thus, the spallation drill heads can be adapted for use in hot spallation drilling.

Elements to maintain operating temperatures for any electronics and hydraulics inside the apparatus can be used when operating in high temperature ambient conditions. Such temperature control elements are not illustrated, but can utilize the cold fluid entering the apparatus as well as thermoelectric or other cooling mechanisms.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A spallation drill head, comprising:
a drill head body having a primary face substantially oriented facing in a primary drilling direction along a longitudinal axis of the drill head body;
a liquid inlet on the drill head body, wherein the liquid inlet is connected or connectable to a liquid supply line;
an internal liquid connection oriented within the drill head body and fluidly connected to the liquid inlet;
a plurality of liquid jets oriented on the primary face of the drill head, wherein the liquid jets are fed by the liquid inlet through the internal liquid connection;
a mass flow controller associated with the liquid jets to control delivery of liquid by the liquid jets, wherein flowrates to at least two of the liquid jets are independently controllable;
wherein the spallation drill head is adapted for cold spallation drilling at a geothermal reservoir temperature greater than 300° C. by being formed of materials capable of use at the geothermal reservoir temperature; and
a temperature sensor in communication with the mass flow controller which is adapted to adjust flow of the liquid to control a temperature differential between the liquid and adjacent rock, wherein a liquid temperature is lower than a rock temperature.

2. The spallation drill head of claim 1, wherein the drill head does not include a mechanical drill head oriented to drill in the primary drilling direction, such that the drill head drills in the primary drilling direction by non-contact cold spallation.

3. The spallation drill head of claim 1, wherein the plurality of liquid jets comprises at least two groups of liquid jets, wherein the spallation drill head further comprises valves fluidly connected to the groups of liquid jets to independently control liquid flow to the liquid jets in the groups to allow steering the drill head by flowing more liquid through at one group than through at least one other group.

4. The spallation drill head of claim 1, wherein the liquid inlet is an only inlet for liquid to be delivered such that only a single liquid can be delivered via the drill head.

5. The spallation drill head of claim 1, wherein the mass flow controller comprises a valve configured to produce a pulsed liquid flow through the liquid jet.

6. The spallation drill head of claim 1, further comprising a cold liquid pump in fluid communication with the plurality of liquid jets to pressurize cold liquid jetted from the plurality of liquid jets.

7. The spallation drill head of claim 1, further comprising a chiller within the drill head body and associated with the internal liquid connection to chill liquid fed to the plurality of liquid jets.

8. The spallation drill head of claim 1, further comprising a slurry extraction opening on the drill head body in a forward region of the drill head body and a slurry outlet on the drill head body in a rearward region of the drill head body, wherein the slurry outlet is connected to the slurry extraction opening by an internal slurry connection within the drill head body, and wherein the slurry outlet is connected or connectable to a slurry line.

9. The spallation drill head of claim 8, further comprising at least one of:
a slurry pump associated with the internal slurry connection to pump a slurry of liquid and rock fragments up the slurry line;
wherein the slurry extraction opening is on a lateral face of the drill head body; and
an inflatable packer on a lateral face of the drill head body, wherein inflating the inflatable packer causes the inflatable packer to expand and fill space between the lateral face of the drill head body and an interior face of a borehole.

10. The spallation drill head of claim 1, further comprising wheels at a lateral face of the drill head body, wherein the wheels extend outward from the drill head body to an interior face of a borehole.

11. The spallation drill head of claim 1, further comprising at least one lateral liquid jet oriented on a lateral face of the drill head body.

12. A method of spallation drilling, comprising:
placing a spallation drill head of claim 1 in a borehole of a geothermal reservoir having a temperature greater than 300° C.;
jetting liquid from the liquid jets onto rock of the borehole, wherein the liquid has a temperature different from a temperature of the rock with a sufficient temperature difference that the jetting the liquid causes thermal fracturing in the rock along a primary drilling direction, thereby forming loose rock fragments through a combination of thermal fracturing and liquid pressure and wherein the liquid being jetted is colder than the rock such that the drill head drills in the primary drilling direction by non-contact cold spallation;
controlling flow of at least one liquid jet independently from at least one other liquid jet using the mass flow controller such that different amounts of liquid are jetted from the independently controlled liquid jets to cause different amounts of fracturing; and
removing the liquid and loose rock fragments from the borehole as a slurry.

13. The method of claim 12, wherein at least one of:
wherein the temperature difference between the liquid being jetted and the rock is from about 50° C. to about 800° C.;
wherein the liquid being jetted has a temperature from about 0° C. to about 100° C.; and
wherein the method further comprises chilling the liquid before jetting the liquid.

14. The method of claim 12, further comprising steering the drill head to form a curved borehole.

15. The method of claim 12, further comprising increasing pressure of the liquid after being jetted onto the rock by inflating an inflatable packer between a lateral face of the drill head and an interior face of the borehole, thereby isolating a volume containing the liquid jetted onto the rock.

16. The method of claim 15, further comprising inflating a second inflatable packer between a lateral face of the drill head and an interior face of the borehole.

17. The method of claim 12, further comprising jetting liquid from at least one lateral liquid jet in a lateral direction substantially perpendicular to the primary drilling direction.

18. The method of claim 12, wherein the drilling is in a lateral direction.

19. The method of claim 18, wherein the borehole is a secondary borehole extending laterally off of a vertical primary borehole.

20. The spallation drill head of claim 1, wherein the primary face of the drill head is oriented on an extendable portion which is extendable away from the drill head body and having a retracted position and an extended position allowing the primary face to move downward while the drill head body remains stationary.

21. A spallation drill head, comprising:
- a drill head body having a primary face substantially oriented facing in a primary drilling direction along a longitudinal axis of the drill head body;
- a liquid inlet on the drill head body, wherein the liquid inlet is connected or connectable to a liquid supply line;
- an internal liquid connection oriented within the drill head body and fluidly connected to the liquid inlet;
- at least one liquid jet oriented on the primary face of the drill head, wherein the at least one liquid jet is fed by the liquid inlet through the internal liquid connection;
- a mass flow controller associated with the at least one liquid jet to control delivery of liquid by the at least one liquid jet;
- a slurry extraction opening on the drill head body in a forward region of the drill head body;
- a slurry outlet on the drill head body in a rearward region of the drill head body, wherein the slurry outlet is connected to the slurry extraction opening by an internal slurry connection within the drill head body; and
- an actuatable sealing element on the drill head body between the slurry extraction opening and the slurry outlet, the sealing element being actuatable to temporarily seal a portion of a borehole forward of the sealing element from a portion of borehole rearward of the sealing element.

22. The spallation drill head of claim 21, wherein the actuatable sealing element comprises an inflatable packer on a lateral face of the drill head body, wherein inflating the inflatable packer causes the inflatable packer to expand and fill space between the lateral face of the drill head body and an interior face of a borehole.

23. The spallation drill head of claim 22, wherein the drill head body has a cylindrical shape and wherein the inflatable packer is shaped as an annular tube around a circumference of the drill head body.

24. The spallation drill head of claim 21, further comprising a slurry pump associated with the internal slurry connection to pump a slurry of liquid and rock fragments up the slurry line.

25. The spallation drill head of claim 21, wherein the slurry extraction opening is on a lateral face of the drill head body.

* * * * *